(12) United States Patent
Metcalfe

(10) Patent No.: US 10,843,157 B2
(45) Date of Patent: Nov. 24, 2020

(54) CHEMICAL LOOPING

(71) Applicant: University of Newcastle upon Tyne, Newcastle upon Tyne (GB)

(72) Inventor: Ian Metcalfe, Newcastle upon Tyne (GB)

(73) Assignee: University of Newcastle Upon Tyne, Newcastle upon Tyne (GB)

( * ) Notice: Subject to any disclaimer, the term of this patent is extended or adjusted under 35 U.S.C. 154(b) by 310 days.

(21) Appl. No.: 15/741,998

(22) PCT Filed: Jul. 7, 2016

(86) PCT No.: PCT/GB2016/052044
§ 371 (c)(1),
(2) Date: Jan. 4, 2018

(87) PCT Pub. No.: WO2017/006121
PCT Pub. Date: Jan. 12, 2017

(65) Prior Publication Data
US 2018/0207599 A1    Jul. 26, 2018

(30) Foreign Application Priority Data

Jul. 7, 2015    (GB) .................................. 1511855.7

(51) Int. Cl.
*B01J 8/02* (2006.01)
*C01B 3/12* (2006.01)
(Continued)

(52) U.S. Cl.
CPC ........... *B01J 8/0278* (2013.01); *B01J 8/0221* (2013.01); *B01J 8/0285* (2013.01); *C01B 3/12* (2013.01);
(Continued)

(58) Field of Classification Search
None
See application file for complete search history.

(56) References Cited

U.S. PATENT DOCUMENTS 6,713,176 B2    3/2004  Yadav et al.
9,353,023 B2 *  5/2016  Henao ................... B01J 19/245
(Continued)

FOREIGN PATENT DOCUMENTS

CN    103204464 A    7/2013
EP    2 551 587      1/2013

OTHER PUBLICATIONS

Dueso et al., "High-stability, high-capacity oxygen carriers: Iron oxide-perovskite composite materials for hydrogen production by chemical looping," *Applied Energy*, 157(26): 382-390.
(Continued)

*Primary Examiner* — Wayne A Langel
(74) *Attorney, Agent, or Firm* — Klarquist Sparkman, LLP

(57) ABSTRACT

This invention relates to a method of chemical looping using non-stoichiometric materials with a variable degree of non-stoichiometry. One application of these methods is in the water gas shift reaction for $H_2$ production. The methods of the invention can overcome limitations, e.g. those associated with chemical equilibria, which prevent chemical processes from proceeding with complete conversion of starting materials to products.

22 Claims, 11 Drawing Sheets

(51) Int. Cl.
    *C01B 3/34*    (2006.01)
    *C01B 3/58*    (2006.01)
    *C01F 17/30*   (2020.01)

(52) U.S. Cl.
    CPC ............... *C01B 3/34* (2013.01); *C01B 3/583* (2013.01); *C01F 17/30* (2020.01); *B01J 2208/00548* (2013.01); *B01J 2208/027* (2013.01); *C01B 2203/0233* (2013.01); *C01B 2203/0283* (2013.01); *C01B 2203/044* (2013.01); *C01B 2203/047* (2013.01); *C01B 2203/1241* (2013.01)

(56) References Cited

U.S. PATENT DOCUMENTS

| | | | |
|---|---|---|---|
| 2008/0164443 A1 | 7/2008 | White et al. | |
| 2009/0062591 A1 | 3/2009 | Bingue et al. | |
| 2014/0275297 A1* | 9/2014 | Velazquez-Vargas | C10G 2/30 |
| | | | 518/702 |
| 2014/0377158 A1* | 12/2014 | Andrus, Jr. | B01J 8/24 |
| | | | 423/437.1 |
| 2015/0152025 A1* | 6/2015 | Cizeron | C07C 2/84 |
| | | | 585/324 |
| 2015/0238915 A1* | 8/2015 | Fan | B01J 8/0278 |
| | | | 422/630 |
| 2015/0343416 A1* | 12/2015 | Fadhel | B01J 8/0055 |
| | | | 252/186.1 |
| 2016/0002034 A1* | 1/2016 | Fan | B01J 8/12 |
| | | | 252/373 |
| 2016/0023190 A1* | 1/2016 | Fan | B01J 37/08 |
| | | | 502/242 |
| 2019/0255500 A1* | 8/2019 | Sofranko | B01J 8/02 |

OTHER PUBLICATIONS

Heidebrecht et al., "Thermodynamic analysis of a cyclic water gas-shift reactor (CWGSR) for hydrogen production," *Chemical Engineering Science*, 64(23): 5057-5065, Dec. 1, 2009.

International Search Report and Written Opinion issued for PCT/GB2016/052044 dated Sep. 21, 2016.

Murugan et al., "A chemical looping process for hydrogen production using iron-containing perovskites," *Energy & Environmental Science*, 4(11): 4639-4649, Jan. 1, 2011.

Thursfield et al., "Chemical looping and oxygen permeable ceramic membranes for hydrogen production: a review," *Energy & Environmental Science*, 5(6): 7421, Jan. 1, 2012.

Moghtaderi et al., "Review of the recent chemical looping process developments for novel energy and fuel applications," *Energy & Fuels*, 26(1): 15-40, Oct. 26, 2011.

Sunarso et al., "Mixed ionic-electronic conducting (MIEC) ceramic-based membranes for oxygen separation," *Journal of Membrane Science*, 320(1-2): 13-41, Apr. 15, 2008.

* cited by examiner

CHEMICAL LOOPING

CROSS REFERENCE TO RELATED APPLICATONS

This is the U.S. National Stage of International Application No. PCT/Gb2016/052044,filed Jul. 7, 2016, which was published in English under PCT Article 21(2), which in turn claims the benefit of Great Britain Application No. 1511855.7, filed Jul. 7, 2015, which is incorporated herein in its entirety.

This invention relates to a method of chemical looping using non-stoichiometric materials with a variable degree of non-stoichiometry. One application of these methods is in the water gas shift reaction for $H_2$ production. The methods of the invention can overcome limitations, e.g. those associated with chemical equilibria, which prevent chemical processes from proceeding with complete conversion of starting materials to products.

BACKGROUND

Many important chemical reactions are reversible in nature. The progress of such chemical reactions is fundamentally limited by the chemical equilibrium that is established when reactants are mixed and allowed to react. Equilibrium limitations lead to the incomplete conversion of reactants, the need for complex separation processes and the recycling of unused reactants.

One such reversible reaction is the water-gas shift reaction (WGS) whereby carbon monoxide (CO) is reacted with water ($H_2O$) to produce hydrogen ($H_2$) and carbon dioxide ($CO_2$). This reaction is important in $H_2$ production processes and normally takes its water and CO-containing feed stream from e.g. a hydrocarbon steam reforming process performed at temperatures around 800° C. or higher. The reversible exothermic nature of the WGS reaction means that a complex multistep process is required for $H_2$ production. $H_2$ and $CO_2$ are typically ultimately separated by pressure-swing adsorption. While low temperature reforming or shift may be feasible, innovative processes to increase conversion at kinetically-advantageous high temperatures have focussed on methods to remove one of the products of the reaction in-situ. Such methods have included employing palladium membranes for $H_2$ separation and application of the so-called enhanced-WGS process to remove $CO_2$ through the formation of calcium carbonate.

Chemical looping (CL) is a dynamic process in which a material e.g. a metal oxide (which acts as an oxygen carrier material or OCM) is used to provide an element such as oxygen for a reaction during which the material itself undergoes reduction (see 'Chemical looping and oxygen permeable ceramic membranes for hydrogen production—a review'; Thursfield et al; *Energy Environ. Sci.,* 2012, 5, 7421-59). The reduced oxide or metal is then reoxidised in either a second reactor or in a second step if a fixed bed is used. The result is that a CL process physically (or temporally) separates an overall process into its separate oxidation and reduction steps through the use of a solid phase material capable of itself undergoing oxidation and reduction. CL has previously been applied to energy conversion, reforming and WGS processes. Importantly the oxidising and reducing streams fed to a CL process are never mixed with each other and thus an 'unmixed' reaction is performed.

Reverse flow chemical looping is where the oxidising and reducing gases pass through a reactor in opposite directions. In particular, a reverse flow chemical looping water gas shift reaction has been carried out using iron oxide as the OCM ('Thermodynamic analysis of a cyclic water gas-shift reactor (CWGSR) for hydrogen production'; Heidebrecht et al.; *Chemical Engineering Science,* 2009, 64, 5057-5065).

Non-stoichiometric materials have been used in chemical looping water gas shift reactions ('A chemical looping process for hydrogen production using iron-containing perovskites'; Murugan et al; *Energy Environ. Sci.;* 2011, 4, 4639-4649).

BRIEF SUMMARY OF THE DISCLOSURE

In accordance with the present invention there is provided a method of carrying out a chemical reaction which involves the transfer of an element or group X from one chemical species to another, the method comprising sequentially:

A) passing a chemical species P through a fixed bed reactor, the chemical species P flowing from a first position of the fixed bed reactor to a second position of the fixed bed reactor, and extracting the resulting chemical species $PX_y$ from the second position of the fixed bed reactor; and then B) passing a chemical species $QX_z$ through the fixed bed reactor, the chemical species $QX_z$ flowing from the second position of the fixed bed reactor to the first position of the fixed bed reactor, and extracting the resulting chemical species Q from the first position of the fixed bed reactor;

C) optionally repeating steps A) and B) in sequence at least once;

wherein P and Q are chemical species which are selected such that both P and Q can accept the element or group X and, both $PX_y$ and $QX_z$ can donate the element or group X; y and z are integers; and wherein the fixed bed reactor comprises at least one non-stoichiometric material which has the formula $M_nX_{p(1-q)}$ where n and p are integers required for stoichiometric bonding between M and X and $0<q<1$ or $0>q>-1$; wherein the material is able to adopt a range of values of q; and wherein M may represent a single element or a mixture of more than one element.

The variably non-stoichiometric material should have the ability to both donate and accept the element or group X under the reaction conditions. The non-stoichiometric oxides of the invention will typically have the ability to transport the element or group X. Thus, ions of the element or group X must be able to diffuse into the material.

M may represent a single metallic element or a mixture of more than one metallic element.

The inventors have found that when reversible reactions are performed using a reverse flow chemical looping system with a fixed bed of a variably non-stoichiometric material, a substantially pure product stream can be produced, avoiding the need for energy consuming, costly processes to separate equilibrium mixtures.

Without wishing to be bound by theory it is believed that a gradient is generated across the fixed bed during both step A) and step B), the gradient being in the potential of the non-stoichiometric material to accept or to donate X. The gradient may thus be described as a chemical potential gradient. Thus, following step A) the first position of the fixed bed reactor has the highest X accepting potential and the second position of the fixed bed reactor has the lowest X accepting potential. In step B), when the stream of $QX_z$ is exposed to the low accepting potential at the second position only small amounts of X are accepted by the non-stoichiometric material but as the mixture of Q and $QX_z$ passes up the potential gradient, the equilibrium is driven further towards Q until at the first position, a mixture which has relatively little $QX_z$ is exposed to the highest X accepting potential, effectively driving the reaction towards completion. Following step B), the first position of the fixed bed reactor has the lowest X donating potential and the second position of the fixed bed reactor has the highest X donating potential. In step A), when the stream of P is exposed to the low donating potential at the first position only small amounts of X are donated by the stoichiometric material but as the mixture of P and $PX_y$ passes up the potential gradient, the equilibrium is driven further towards $PX_y$, until at the second position, a mixture which has relatively little P is exposed to the highest X donating potential, effectively driving the reaction to completion. Thus, the process of the invention can overcome equilibrium limitations and allow the reaction to proceed with substantially complete conversion of starting materials to products.

Thus, the products $PX_y$ and Q are produced in high purities in both step A) and step B) respectively. In chemical looping processes that do not use both reverse flow and a variably non-stoichiometric material, a substantial excess of P would be needed in order to obtain a good conversion of $QX_z$ to Q. Only a small amount of that P would be converted to $PX_y$ and thus in obtaining a high purity of Q, the vast majority of the P remains unreacted. Thus, in prior art processes either the transfer conversion for one reaction (either P to $PX_y$ or $QX_z$ to Q) is very low and the purity of the product of the other reaction is high or the transfer conversion of one reaction is good but the purity of the product of the other reaction is low and subsequent separation steps are necessary. In the processes of the invention, both the reaction of P to $PX_y$ and the reaction of $QX_z$ to Q proceed with high levels of conversion. Thus for the processes of the reaction, both the conversions for the X transfer reactions and the purity of the products are high.

Thus, it may be that greater than 50% of both $QX_z$ and P are converted to Q and $PX_y$, respectively. It may be that greater than 75% of both $QX_z$ and P are converted to Q and $PX_y$, respectively or that greater than 90% of both $QX_z$ and P are converted to Q and $PX_y$, respectively.

Typically, the first position of the fixed bed reactor will be a first end of the fixed bed reactor and the second position may be a second end. It is within the scope of the invention that the fixed bed reactor is circular or in the form of a stack or other form which might not be considered to have an end. The fixed bed reactor will typically comprise a housing. Thus, the gases are typically supplied to and extracted from the fixed bed reactor through a first port and a second port in the housing, the ports being situated at or in the vicinity of the first position or end of the fixed bed reactor and the second position or end of the fixed bed reactor. There may be a plurality of first ports and/or a plurality of second ports in the vicinity of the first position and the second position respectively.

The non-stoichiometric material will typically be a solid. Exceptionally, the non-stoichiometric material may be a liquid. Where the non-stoichiometric material is a liquid, it will typically be immobilised, e.g. by using porous solid pellets with the liquid non-stoichiometric material absorbed in the pores. This would limit the amount of mixing of the liquid to that which occurs within the pellet itself and thus the X donating or accepting gradient along the length of the bed can be maintained.

The chemical species P and Q may each independently be a single atom or they may be more than one atom. Where chemical species P or Q are more than one atom, the atoms of which chemical species P and Q are formed may be of the same element or a different element. Where chemical species P or Q are formed from more than one atom, it may be that the bonds between the component atoms of chemical species P and Q are broken during the formation of $PX_y$ and $QX_z$ (this will be the case, for example, where Q is $H_2$ and $QX_z$ is $H_2O$) or it may be that the bonds remain unbroken (this will be the case, for example, where P is CO and $PX_y$ is $CO_2$). The bonding, in terms of the number and connectivity of covalent bonds, between the component atoms of P may be the same in P and $PX_y$ (this will be the case, for example, where P is CO and $PX_y$ is $CO_2$) or it may be different. The bonding, in terms of the number and connectivity of covalent bonds, between the component atoms of Q may be the same in Q and $QX_z$ or it may be different (this will be the case, for example, where Q is $H_2$ and $QX_z$ is $H_2O$). Where P and Q are more than one atom, it will typically be the case that that they each form a single molecule but it is conceivable that in one of the forms (i.e. P or $PX_y$; or Q or $QX_z$) P and/or Q represents multiple molecules (this will be the case were P is a mixture of CO and $H_2$ and $PX_y$ is a mixture of $CO_2$ and $H_2O$). Thus it may be that $QX_z$ is converted to $Q^1$ and $Q^2$, where $Q^1$ and $Q^2$ together contain all the atoms of Q. It may be that $Q^1$ and $Q^2X_z$ are converted to Q, where $Q^1$ and $Q^2$ together contain all the atoms of Q. Thus it may be that P is converted to $P^1X_y$ and $P^2$, where $P^1$ and $P^2$ together contain all the atoms of P (this will be the case where P is a hydrocarbon and $PX_y$ is a mixture of CO and $H_2$). It may be that $P^1$ and $P^2$ are converted to $PX_y$, where $P^1$ and $P^2$ together contain all the atoms of P. The atoms which P contain may include the element X, in a form which is not transferred under the reaction conditions. Likewise, the atoms which Q contain may include the element X, in a form which is not transferred under the reaction conditions.

The reaction may in fact be a purification. In this case P and Q are the same and $PX_y$ and $QX_z$ are the same but the P and $PX_y$ streams contains significant levels of impurities (other than P and $PX_y$) whereas the Q and $QX_z$ streams are substantially pure (comprising substantially nothing other than Q and $QX_z$).

P, $PX_y$, Q and $QX_z$ will typically all be gases within the temperature range of the reaction. It is possible, however, that any one or more of P, $PX_y$, Q and $QX_z$ is another form of fluid, e.g. a liquid or even a powder.

It may be that P is passed through the reactor in step A) as a mixture with other components. Thus, it may be that a mixture comprising P and $PX_y$ is passed through the reactor in step A). Initially, the mixture will typically comprise more P than $PX_y$. Thus, it may be that the mixture is greater than 70 molar % P, with the remainder being $PX_y$ and/or other impurities. It may be that the mixture is greater than 80 molar % P. It may be that the mixture is greater than 90 molar % P. Other impurities which may be present include impurities from the formation of P. P, or an aforementioned mixture comprising P, may be passed through the reactor as a mixture with an inert diluent (e.g. $N_2$).

It may be that $QX_z$ is passed through the reactor in step B) as a mixture with other components. Thus, it may be that a mixture comprising $QX_z$ and Q is passed through the reactor in step B). Initially, the mixture will typically comprise more $QX_z$ than Q. Thus, it may be that the mixture is greater than 70 molar % $QX_z$, with the remainder being Q and/or other impurities. It may be that the mixture is greater than 80 molar % $QX_z$. It may be that the mixture is greater than 90 molar % $QX_z$. Other impurities which may be present include impurities from the formation of $QX_z$. $QX_z$, or an aforementioned mixture comprising $QX_z$, may be passed through the reactor as a mixture with an inert diluent (e.g. $N_2$). It may be that a mixture of P and $PX_y$ is extracted from the reactor in step A). The mixture extracted will typically comprise more $PX_y$ than P. Thus, it may be that the mixture is greater than 70 molar % $PX_y$, with the remainder being P and/or other impurities. It may be that the mixture is greater than 80 molar % $PX_y$. It may be that the mixture is greater than 90 molar % $PX_y$. The $PX_y$ extracted from the reactor in step A) may also comprise small (i.e. less than 5 molar % in total) amounts of Q and/or $QX_z$.

It may be that a mixture of Q and $QX_z$ extracted from the reactor in step B). The mixture extracted will typically comprise more Q than $QX_z$. Thus, it may be that the mixture is greater than 70 molar % Q, with the remainder being $QX_z$ and/or other impurities. It may be that the mixture is greater than 80 molar % Q. It may be that the mixture is greater than 90 molar % Q. The Q extracted from the reactor in step A) may comprise small (i.e. less than 5 molar % in total) amounts of P and/or $PX_y$.

This purity discussed in the preceding two paragraphs is the purity obtained straight from the reaction, i.e. before any further purification step is applied.

It may be that Q and/or $PX_y$ undergoes a purification step once it has been extracted from the reactor.

The reaction rates for the conversion of P to $PX_y$ will typically differ from those for $QX_z$ to Q.

Thus, it may be that the durations of step A) and step B) are different. Alternatively, it may be that the durations of step A) and B) are the same.

It may be that the flow rate of P is the same as the flow rate of $QX_y$ or it may be that the flow rates are different.

It may be that more two or more reactors are operated in parallel. Thus one or more reactors can be performing step A) at the same time as one or more reactors are performing step B). This allows the production of constant streams of $PX_y$ and Q. Where the reaction rate for the conversion of P to $PX_y$ differs from that of $QX_z$ to Q, this may be compensated for by having more reactors performing step A at any given time or by having more reactors performing step B at any given time. Alternatively, it may be that the same number of reactors are performing step A as are performing step B at any given time.

It may be that a step D is carried out after step B and before step A. Step D comprises passing a further donator of X through the reactor bed, the further X donator flowing from the second position of the fixed bed reactor to the first position of the fixed bed reactor. It may be that a step E is carried out after step A and before step B. Step E comprises passing a further acceptor of X through the reactor bed. This can be used to increase the potency of the system and/or to generate heat to drive an endothermic reaction. The further X acceptor may flow from the first position of the fixed bed reactor to the second position of the fixed bed reactor.

The reactor may be at a temperature of from 300° C. to 1200° C., e.g. from 500° C. to 1100° C. The reactor may be at a temperature of from 600° C. to 1000° C. The reactor may be at a temperature of from 750° C. to 950° C. The reactor may be at a temperature of from 800° C. to 900° C.

The temperatures of the reactor for step A and step B may be different or they may be the same. The pressures of the reactor for step A and step B may be different or they may be the same.

The process of the invention may be a continuous process. Alternatively, the processes of the invention may be performed in a batchwise manner.

The process will be an oxidation/reduction process but that is not to say that it will always involve the transfer of oxygen: oxidation/reduction processes may also involve the transfer of other elements, e.g. hydrogen. X may be a group, e.g. hydroxide group, but will more typically be an element. Element X will typically be a non-metal (e.g. an element selected from H, B, C, N, O, F, Si, P, S, Cl, As, Se, Br, Te, I). X may be sulphur. X may be nitrogen. X may be hydrogen. X may be a halogen. Preferably, X is oxygen.

Q may be $H_2$, in which case $QX_z$ will be $H_2O$. In this embodiment, P may be CO (in which case $PX_y$ is $CO_2$), $H_2$ (in which case $PX_y$ is $H_2O$), an organic compound (in which case $PX_y$ is a mixture of $H_2$, CO and possibly $H_2O$ and $CO_2$) or a mixture thereof.

Process I—Water Gas Shift Reaction

The method may be a method of carrying out a water gas shift reaction to produce $H_2$. In these embodiments, X is oxygen, P is CO, $PX_y$ is $CO_2$, $QX_z$ is $H_2O$ and Q is $H_2$. Thus, it may be that the method is a method of producing $H_2$, the method comprising sequentially:

A) passing CO through a fixed bed reactor, the CO flowing from a first position of the fixed bed reactor to a second position of the fixed bed reactor, and extracting the resulting $CO_2$ from the second position of the fixed bed reactor; and then B) passing $H_2O$ through the fixed bed reactor, the $H_2O$ flowing from the second position of the fixed bed reactor to the first position of the fixed bed reactor, and extracting the resulting $H_2$ from the first position of the fixed bed reactor;

C) optionally repeating steps A) and B) in sequence at least once;

wherein the fixed bed reactor comprises at least one non-stoichiometric material which has the formula $M_nO_{p(1-q)}$ where n and p are integers required for stoichiometric bonding between M and O and $0<q<1$ or $0>q>-1$; wherein the material is able to adopt a range of values of q; and wherein M may represent a single element or a mixture of more than one element.

As a demonstration of the general approach of the first aspect of the invention, $H_2$ has been produced via a water-gas shift reaction utilising a non-stoichiometric oxygen carrier. A $H_2O$ to $H_2$ conversion of 85% was achieved, a considerable improvement on the 70% which was achieved by Heidebrecht et al using iron oxide. Notably, the high $H_2O$ to $H_2$ conversion was achieved without using a large excess of CO (the conversion or CO to $CO_2$ was also 85%) and the reaction achieves thus both a high yield of oxygen transfer and a high purity of product. A further benefit is that the non-stoichiometric materials of the invention offer increased longevity relative to materials used in prior art processes.

Process II—Oxidising a $H_2$/CO Gas Mixture

The method may be a method of oxidising a reformate gas and producing $H_2$. In these embodiments, X is oxygen, P is a mixture of $H_2$ and CO, $PX_y$ is a mixture of $H_2O$ and $CO_2$, $QX_z$ is $H_2O$ and Q is $H_2$. Thus, it may be that the method is a method of producing $H_2$, the method comprising sequentially:

A) passing a mixture of $H_2$ and CO through a fixed bed reactor, the $H_2$ and CO flowing from a first position of the fixed bed reactor to a second position of the fixed bed reactor, and extracting the resulting $H_2O$ and $CO_2$ from the second position of the fixed bed reactor; and then B) passing $H_2O$ through the fixed bed reactor, the $H_2O$ flowing from the second position of the fixed bed reactor to the first position of the fixed bed reactor, and extracting the resulting $H_2$ from the first position of the fixed bed reactor;

C) optionally repeating steps A) and B) in sequence at least once;

wherein the fixed bed reactor comprises at least one non-stoichiometric material which has the formula $M_nO_{p(1-q)}$ where n and p are integers required for stoichiometric bonding between M and O and $0<q<1$ or $0>q>-1$; wherein the material is able to adopt a range of values of q; and wherein M may represent a single element or a mixture of more than one element.

The method may comprise a step F before step A, step F comprising providing the mixture of $H_2$ and CO by reforming, e.g. steam reforming, at least one organic molecule, e.g. methane. Step F may comprise carrying out a process as described below under Process III.

Both the CO and the $H_2$ present in the reformate gas accept an oxygen from the non-stoichiometric material and thus the reductive power of both the $H_2$ and the CO is used to remove the oxygen from $H_2O$ to generate a pure $H_2$ stream.

Process III—Reforming an Organic Molecule

The method may be a method of reforming at least one organic molecule, e.g. methane, and also producing $H_2$. Thus, it may be that P is at least one organic molecule, $PX_y$ is a mixture of CO and $H_2$, $QX_z$ is $H_2O$ and Q is $H_2$. Where the organic molecule is methane, X is oxygen, P is $CH_4$, $PX_y$ is CO and $2H_2$, $QX_z$ is $H_2O$ and Q is $H_2$. Thus, it may be that the method is a method of producing $H_2$, the method comprising sequentially:

A) passing at least one organic molecule (e.g. methane) through a fixed bed reactor, the at least one organic molecule flowing from a first position of the fixed bed reactor to a second position of the fixed bed reactor, and extracting the resulting mixture of $H_2$ and CO from the second position of the fixed bed reactor; and then B) passing $H_2O$ through the fixed bed reactor, the $H_2O$ flowing from the second position of the fixed bed reactor to the first position of the fixed bed reactor, and extracting the resulting $H_2$ from the first position of the fixed bed reactor;

C) optionally repeating steps A) and B) in sequence at least once;

wherein the fixed bed reactor comprises at least one non-stoichiometric material which has the formula $M_nO_{p(1-q)}$ where n and p are integers required for stoichiometric bonding between M and O and $0<q<1$ or $0>q>-1$; wherein the material is able to adopt a range of values of q; and wherein M may represent a single element or a mixture of more than one element.

The method may comprise a step D, carried out after step B and before step A, step D comprising passing $O_2$ through the reactor bed, the $O_2$ flowing from the second position of the fixed bed reactor to the first position of the fixed bed reactor.

The product of step A is a reformate gas which may itself be subsequently used as a reducing gas for a process of converting $H_2O$ to $H_2$ as described above under Process II. These two processes (the first process being the formation of the reformate gas and a first conversion of $H_2O$ to $H_2$ and the second process being oxidation of the resultant reformate gas and a second conversion of $H_2O$ to $H_2$) might be performed in separate reactors (see Process V below) or they might be performed in the same reactor (see Process VI below).

Process IV—Reforming an Organic Molecule with Subsequent Oxidation of Reformate Gas and Recycling of Heat Produced Following the reformation of at least one organic molecule by the methods of the invention (e.g. Process III), the mixture of $H_2$ and CO obtained in step A may be further oxidised, e.g. by exposing the mixture to $O_2$ or other oxidative environment, to $CO_2$ or $H_2O$. This oxidation will typically be exothermic and can generate heat which can be transferred using conventional means to the fixed bed reactor in which the endothermic reformation reaction is carried out to drive the reaction.

As an example, it may be that the method is a method of producing $H_2$, the method comprising sequentially:

A) passing at least one organic molecule (e.g. methane) through a first fixed bed reactor, the at least one organic molecule flowing from a first position of the first fixed bed reactor to a second position of the first fixed bed reactor, and extracting the resulting mixture of $H_2$ and CO from the second position of the first fixed bed reactor; and then B) passing $H_2O$ through the first fixed bed reactor, the $H_2O$ flowing from the second position of the first fixed bed reactor to the first position of the first fixed bed reactor, and extracting the resulting $H_2$ from the first position of the first fixed bed reactor;

C) optionally repeating steps A) and B) in sequence at least once;

K) passing the mixture of $H_2$ and CO obtained in step A) through a second reactor and extracting the resulting $H_2O$ and $CO_2$ from the second reactor; and L) passing $O_2$ through the second reactor;

M) optionally repeating steps K) and L) in sequence at least once;

N) transferring the heat extracted from the second fixed bed reactor to the first fixed bed reactor;

wherein the first fixed bed reactor comprises at least one non-stoichiometric material which has the formula $M_nO_{p(1-q)}$ where n and p are integers required for stoichiometric bonding between M and O and $0<q<1$ or $0>q>-1$; wherein the material is able to adopt a range of values of q; and wherein M may represent a single element or a mixture of more than one element.

Steps K) and L) may be carried out simultaneously. Alternatively, they may be carried out sequentially.

It may be that steps K) and L) are as follows:

K) passing both the mixture of $H_2$ and CO obtained in step A) through a second fixed bed reactor, the $H_2$ and CO flowing from a first position of the second fixed bed reactor to a second position of the second fixed bed reactor, and extracting the resulting $H_2O$ and $CO_2$ from the second position of the second fixed bed reactor; and then L) passing $O_2$ through the second fixed bed reactor, the $O_2$ flowing from the second position of the second fixed bed reactor to the first position of the second fixed bed reactor, extracting excess $O_2$ from the first position of the second fixed bed reactor, and extracting heat from the second fixed bed reactor;

and that the second reactor comprises at least one non-stoichiometric material which has the formula $M_nO_{p(1-q)}$ where n and p are integers required for stoichiometric bonding between M and O and $0<q<1$ or $0>q>-1$; wherein the material is able to adopt a range of values of q; and wherein M may represent a single element or a mixture of more than one element; wherein the material in the first reactor and the second reactor may be the same or different Process V—Process II and Process III Performed in Separate Reactors It may be that the method is a method of producing $H_2$, the method comprising sequentially:
- A) passing at least one organic molecule (e.g. methane) through a first fixed bed reactor, the at least one organic molecule flowing from a first position of the first fixed bed reactor to a second position of the first fixed bed reactor, and extracting the resulting mixture of $H_2$ and CO from the second position of the first fixed bed reactor; and then
- B) passing $H_2O$ through the first fixed bed reactor, the $H_2O$ flowing from the second position of the first fixed bed reactor to the first position of the first fixed bed reactor, and extracting the resulting $H_2$ from the first position of the first fixed bed reactor;
- C) optionally repeating steps A) and B) in sequence at least once;
- G) passing the mixture of $H_2$ and CO obtained in step A) through a second fixed bed reactor, the $H_2$ and CO flowing from a first position of the second fixed bed reactor to a second position of the second fixed bed reactor, and extracting the resulting $H_2O$ and $CO_2$ from the second position of the second fixed bed reactor; and then
- H) passing $H_2O$ through the second fixed bed reactor, the $H_2O$ flowing from the second position of the second fixed bed reactor to the first position of the second fixed bed reactor, and extracting the resulting $H_2$ from the first position of the second fixed bed reactor;
- I) optionally repeating steps G) and H) in sequence at least once;

wherein the first and second fixed bed reactors each independently comprise at least one non-stoichiometric material which has the formula $M_nO_{p(1-q)}$ where n and p are integers required for stoichiometric bonding between M and O and $0<q<1$ or $0>q>-1$; wherein the material is able to adopt a range of values of q; and wherein M may represent a single element or a mixture of more than one element.

The method may comprise a step D, carried out after step B and before step A, step D comprising passing $O_2$ through the reactor bed, the $O_2$ flowing from the second position of the fixed bed reactor to the first position of the fixed bed reactor.

Process VI—Process II and Process III Performed in the Same Reactor

It may be that the method is a method of producing $H_2$, the method comprising sequentially:
- A) passing at least one organic molecule (e.g. methane) through a fixed bed reactor, the at least one organic molecule flowing from a first position of the fixed bed reactor to a second position of the fixed bed reactor, and extracting the resulting mixture of $H_2O$ and $CO_2$ from the second position of the fixed bed reactor; and then
- B) passing $H_2O$ through the fixed bed reactor, the $H_2O$ flowing from the second position of the fixed bed reactor to the first position of the fixed bed reactor, and extracting the resulting $H_2$ from the first position of the fixed bed reactor;
- C) optionally repeating steps A) and B) in sequence at least once;

wherein the fixed bed reactor comprises at least one non-stoichiometric material which has the formula $M_nO_{p(1-q)}$ where n and p are integers required for stoichiometric bonding between M and O and $0<q<1$ or $0>q>-1$; wherein the material is able to adopt a range of values of q; and wherein M may represent a single element or a mixture of more than one element.

The method may comprise a step D, carried out after step B and before step A, step D comprising passing $O_2$ through the reactor bed, the $O_2$ flowing from the second position of the fixed bed reactor to the first position of the fixed bed reactor.

Examples of other specific processes which could be carried out using the general approach of the first aspect of the invention include the partial unsaturation of a hydrocarbon (e.g. butane; thus, X is hydrogen, P is $O_2$, $PX_y$ is $H_2O$, $QX_z$ is $C_4H_{10}$ and Q is $C_4H_8$) and the conversion of $H_2S$ to $H_2$ (thus, X is sulfur, P is CO, $PX_y$ is COS, $QX_z$ is $H_2S$ and Q is $H_2$).

Materials

It may be that $0<q<1$.

Non-stoichiometric materials suitable for processes of the invention will have similar properties to those used in ion conductive membranes. Thus, use in the processes of the invention of the materials described in Sunarso et al; *Journal of Membrane Science*, 320, 2008, 13-41 are explicitly incorporated by reference.

Non-stoichiometric materials suitable for processes in which X is oxygen (e.g. the water gas shift reaction described above) include oxides based on a fluorite crystal structure (i.e. $AO_{2(1-q)}$); perovskites (i.e. $ABO_{3(1-q)}$); oxides based on a pyrochlore crystal structure ($A_2B_2O_{7(1-q)}$); and oxides based on a brownmillerite ($A_2B_2O_{5(1-q)}$) crystal structure (where A and B are metallic elements). Thus, the material may be a perovskite.

Illustrative perovskites include: $BaBi_{0.5}Co_{0.2}Fe_{0.3}O_{3-\delta}$; $BaBi_{0.4}Co_{0.2}Fe_{0.4}O_{3-\delta}$; $BaBi_{0.2}Co_{0.2}Fe_{0.6}O_{3-\delta}$; $BaCe_{0.4}Fe_{0.6}O_{3-\delta}$; $BaCe_{0.2}Fe_{0.8}O_{3-\delta}$; $BaCe_{0.15}Fe_{0.85}O_{3-\delta}$; $BaCo_{0.4}Fe_{0.5}Zr_{0.1}O_{3-\delta}$; $Ba_{0.5}Sr_{0.5}Co_{0.8}Fe_{0.2}O_{3-\delta}$; $Ba_{0.5}Sr_{0.5}Zn_{0.2}Fe_{0.8}O_{3-\delta}$; $BaTi_{0.2}Co_{0.4}Fe_{0.4}O_{3-\delta}$; $BaTi_{0.2}Co_{0.5}Fe_{0.3}O_{3-\delta}$; $CaTi_{0.8}Fe_{0.2}O_{3-\delta}$; $Gd_{0.6}Sr_{0.4}CoO_{3-\delta}$; $La_{0.6}Ba_{0.4}Co_{0.8}Fe_{0.2}O_{3-\delta}$; $La_{0.4}Ba_{0.6}Co_{0.2}Fe_{0.8}O_{3-\delta}$; $La_{0.2}Ba_{0.8}Co_{0.2}Fe_{0.8}O_{3-\delta}$; $La_{0.6}Ca_{0.4}Co_{0.8}Fe_{0.2}O_{3-\delta}$; $La_{0.4}Ca_{0.6}Co_{0.2}Fe_{0.8}O_{3-\delta}$; $LaCo_{0.8}Fe_{0.2}O_{3-\delta}$; $LaCo_{0.8}Fe_{0.2}O_{3-\delta}$; $LaCo_{0.4}Fe_{0.6}O_{3-\delta}$; $LaCo_{0.8}Fe_{0.1}Ni_{0.1}O_{3-\delta}$; $LaCo_{0.7}Fe_{0.1}Ni_{0.2}O_{3-\delta}$; $LaCo_{0.6}Fe_{0.2}Ni_{0.2}O_{3-\delta}$; $LaCo_{0.5}Fe_{0.2}Ni_{0.3}O_{3-\delta}$; $LaCo_{0.4}Ga_{0.4}Mg_{0.2}O_{3-\delta}$; $LaCo_{0.6}Ga_{0.3}Mg_{0.1}O_{3-\delta}$; $LaCo_{0.9}Mg_{0.1}O_{3-\delta}$; $LaCo_{0.8}W_{0.2}O_{3-\delta}$; $LaFe_{0.8}Ni_{0.2}O_{3-\delta}$; $LaFe_{0.7}Ni_{0.3}O_{3-\delta}$; $LaFe_{0.6}Ni_{0.4}O_{3-\delta}$; $LaFe_{0.5}Ni_{0.5}O_{3-\delta}$; $LaGa_{0.8}Ni_{0.2}O_{3-\delta}$; $LaGa_{0.7}Ni_{0.3}O_{3-\delta}$; $LaGa_{0.6}Ni_{0.4}O_{3-\delta}$; $LaGa_{0.5}Ni_{0.5}O_{3-\delta}$; $LaGa_{0.4}Ni_{0.6}O_{3-\delta}$; $La_{0.6}Na_{0.4}Co_{0.8}Fe_{0.2}O_{3-\delta}$; $La_{0.6}Sr_{0.4}CoO_{3-\delta}$; $La_{0.6}Sr_{0.4}O_{0.8}Cr_{0.2}O_{3-\delta}$; $La_{0.6}Sr_{0.4}Co_{0.8}Cu_{0.2}O_{3-\delta}$; $La_{0.6}Sr_{0.4}Co_{0.2}Fe_{0.2}O_{3-\delta}$; $La_{0.6}Sr_{0.4}Co_{0.2}Fe_{0.6}O_{3-\delta}$; $La_{0.6}Sr_{0.4}Co_{0.8}Fe_{0.2}O_{3-\delta}$; $La_{0.6}Sr_{0.4}Co_{0.8}Fe_{0.2}O_{3-\delta}$; $La_{0.4}Sr_{0.6}Co_{0.2}Fe_{0.8}O_{3-\delta}$; $La_{0.2}Sr_{0.8}Co_{0.2}Fe_{0.8}O_{3-\delta}$; $La_{0.2}Sr_{0.4}Co_{0.8}Fe_{0.6}O_{3-\delta}$; $La_{0.6}Sr_{0.4}Co_{0.8}Mn_{0.2}O_{3-\delta}$; $La_{0.6}Sr_{0.4}Co_{0.8}Ni_{0.2}O_{3-\delta}$; $La_{0.9}Sr_{0.1}FeO_{3-\delta}$; $La_{0.8}Sr_{0.2}FeO_{3-\delta}$; $La_{0.7}Sr_{0.3}FeO_{3-\delta}$; $La_{0.6}Sr_{0.4}FeO_{3-\delta}$; $La_{0.8}Sr_{0.2}Ga_{0.7}Co_{0.3}O_{3-\delta}$; $La_{0.8}Sr_{0.2}Ga_{0.7}Fe_{0.3}O_{3-\delta}$; $La_{0.8}Sr_{0.2}Ga_{0.7}Ni_{0.3}O_{3-\delta}$; $Nd_{0.6}Sr_{0.4}CoO_{3-\delta}$; $Pr_{0.6}Sr_{0.4}CoO_{3-\delta}$; $Sm_{0.6}Sr_{0.4}CoO_{3-\delta}$; $Sr_{0.5}Bi_{0.5}FeO_{3-\delta}$; $SrCoO_{3-\delta}$; $SrCo_{0.4}Fe_{0.6}O_{3-\delta}$; $SrCo_{0.8}Fe_{0.2}O_{3-\delta}$; $SrCo_{0.8}Fe_{0.2}O_{3-\delta}$; $SrCo_{0.89}Fe_{0.1}Cr_{0.01}O_{3-\delta}$; $SrCo_{0.85}Fe_{0.1}Cr_{0.05}O_{3-\delta}$; $SrCo_{0.95}Ti_{0.05}O_{3-\delta}$; $SrCo_{0.8}Ti_{0.2}O_{3-\delta}$; $Sr_{0.7}Gd_{0.3}CoO_{3-\delta}$; $Sr_{0.7}La_{0.3}CoO_{3-\delta}$; $Sr_{0.65}La_{0.35}CoO_{3-\delta}$; $Sr_{0.6}La_{0.4}CoO_{3-\delta}$; $Sr_{0.55}La_{0.45}CoO_{3-\delta}$; $Sr_{0.65}La_{0.35}CoO_{3-\delta}$; $Sr_{0.7}Nd_{0.3}CoO_{3-\delta}$; $Sr_{0.7}Sm_{0.3}CoO_{3-\delta}$; $Y_{0.85}Ba_{0.95}CoO_{3-\delta}$; $Y_{0.1}Ba_{0.9}CoO_{3-\delta}$; and $Y_{0.33}Ba_{0.67}CoO_{3-\delta}$.

Illustrative fluorite-type oxides include: $(Bi_2O_3)_{0.73}(CaO)_{0.27}$; $(Bi_2O_3)_{0.75}(Er_2O_3)_{0.25}$; $(Bi_2O_3)_{0.6}(Tb_2O_{3.5})_{0.4}$; $(Bi_2O_3)_{0.75}(Y_2O_3)_{0.25}$; $Bi_{1.25}Y_{0.5}Cu_{0.25}O_3$; $Bi_{0.5}Cu_{0.5}O_3$; $Bi_{0.75}Y_{0.5}Cu_{0.75}O_3$; $Bi_{1.5}Y_{0.3}Sm_{0.2}O_3$; $Bi_{2.02}Co_{0.13}V_{0.85}O_z$; $Ce_{0.8}Pr_{0.2}O_{2-\delta}$; $Gd_{0.15}Ce_{0.65}Pr_{0.2}O_{2-\delta}$; $Gd_{0.2}Ce_{0.6}Pr_{0.2}O_{2-\delta}$; $(ZrO_2)_{0.85}(CaO)_{0.15}$; $(ZrO_2)_{0.84}(CaO)_{0.16}$; $[(ZrO_2)_{0.9}(CeO_2)_{0.4}]_{0.9}(CaO)_{0.1}$; $[(ZrO_2)_{0.8}(CeO_2)_{0.2}]_{0.9}(CaO)_{0.1}$; $[(ZrO_2)_{0.7}(CeO_2)_{0.3}]_{0.9}(CaO)_{0.1}$; $[(ZrO_2)_{0.6}(CeO_2)_{0.4}]_{0.9}(CaO)_{0.1}$; $(ZrO_2)_{0.7}(Tb_2O_{3.5})_{0.3}$; $(ZrO_2)_{0.7}(Tb_2O_{3.5})_{0.25}(Y_2O_3)_{0.05}$; $(ZrO_2)_{0.7}(Tb_2O_{3.5})_{0.228}(Y_2O_3)_{0.072}$; $(ZrO_2)_{0.8}(Y_2O_3)_{0.20}$; $[(ZrO_2)_{0.89}(Y_2O_3)_{0.11}]_{0.96}(CeO_2)_{0.04}$; $[(ZrO_2)_{0.89}(Y_2O_3)_{0.11}]_{0.87}(CeO_2)_{0.13}$; and $[(ZrO_2)_{0.89}(Y_2O_3)_{0.11}]_{0.77}(CeO_2)_{0.23}$.

Illustrative liquid oxide carriers include molten mixtures of nitrates and nitrites of lithium, sodium and/or potassium. The mix of alkali metal salts reduces the melting temperature and this gives a wider temperature operating window. The mixture of nitrates and nitrites could allow oxygen storage. The oxygen chemical potential in the salt mixture thus depends upon the ratio of nitrate to nitrite and will be able to vary continuously as the composition of the salt changes. Thus such mixtures can behave in a way analogous to a non-stoichiometric solid.

The non-stoichiometric material may comprise lanthanum. The non-stoichiometric material may comprise strontium. The non-stoichiometric material may comprise iron. The non-stoichiometric material may comprise oxygen. The non-stoichiometric material may comprise at least two elements selected from lanthanum, strontium, iron and aluminium. The non-stoichiometric material may comprise at least three elements selected from lanthanum, strontium, iron and aluminium. The non-stoichiometric material may comprise lanthanum, strontium and iron and optionally aluminium. Thus, non-stoichiometric material may comprise lanthanum, strontium, iron and oxygen and optionally aluminium. In certain particular embodiments, the material is selected from $La_{0.8}Sr_{0.2}FeO_{3-\delta}$, $La_{0.8}Sr_{0.2}Fe_{0.94}Al_{0.06}O_{3-\delta}$, $La_{0.7}Sr_{0.3}FeO_{3-\delta}$, $La_{0.7}Sr_{0.3}Fe_{0.94}Al_{0.06}O_{3-\delta}$, $La_{0.6}Sr_{0.4}FeO_{3-\delta}$, $La_{0.6}Sr_{0.4}Fe_{0.94}Al_{0.06}O_{3-\delta}$, $La_{0.5}Sr_{0.5}FeO_{3-\delta}$. In certain particular embodiments, the material is $La_{0.7}Sr_{0.3}FeO_{3-\delta}$ (LSF).

Non-stoichiometric materials suitable for processes in which X is sulphur include compounds having the formula $Fe_{(1-a)}S$, where a is a value between 0.1 and 0.9.

Non-stoichiometric materials suitable for processes in which X is hydrogen include compounds having the formula $PdH_b$, where $0.02<b<0.58$.

BRIEF DESCRIPTION OF THE DRAWINGS

Embodiments of the invention are further described hereinafter with reference to the accompanying drawings, in which.

DETAILED DESCRIPTION

Figure 1:
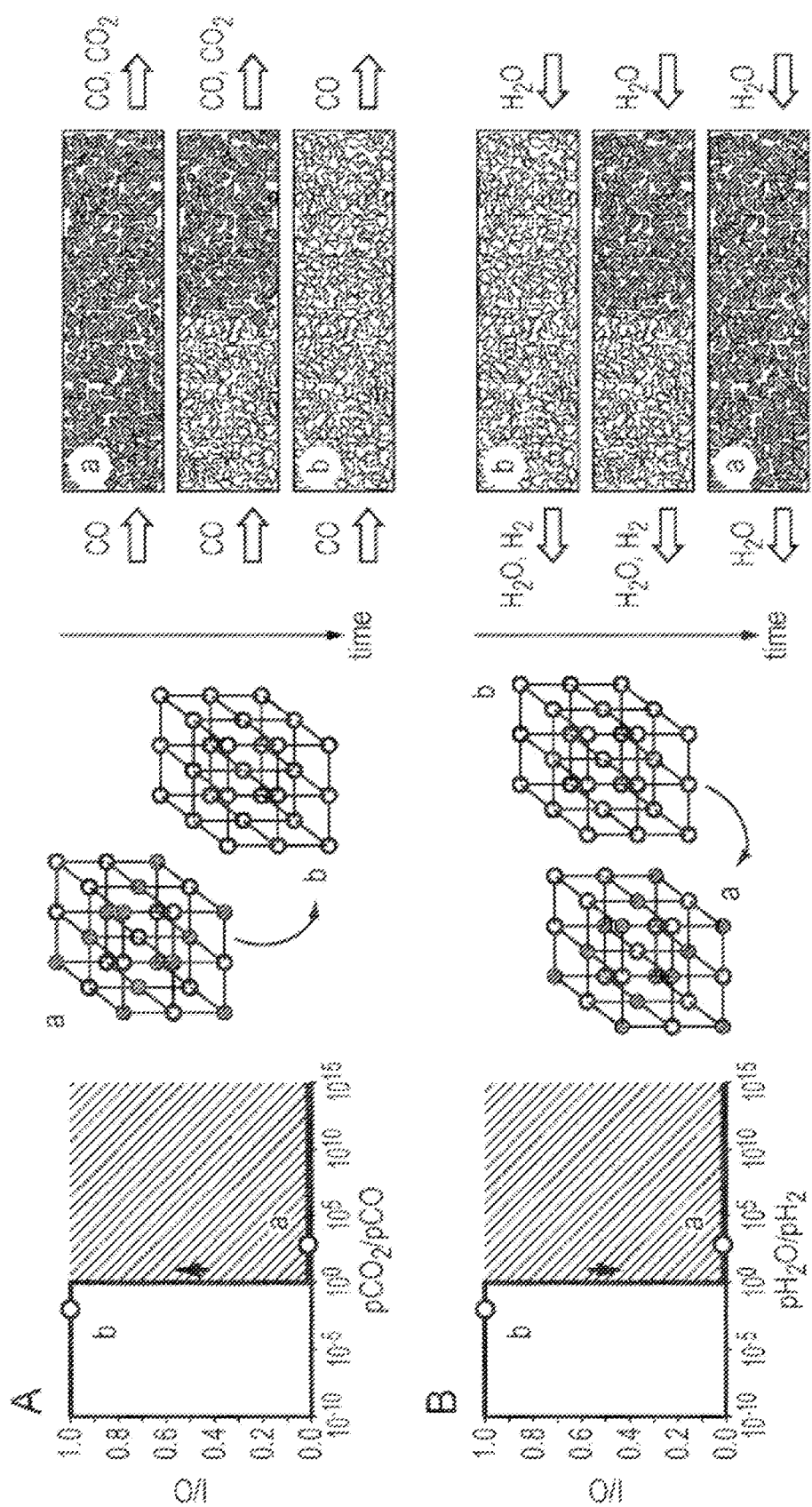
FIG. 1 shows a water-gas shift reaction occurring in a reverse flow reactor using (A and B) a hypothetical metal/metal oxide oxygen-carrier material of general formula $MO_{1-\delta}$ which undergoes a phase change at a water to hydrogen partial pressure ratio of unity and (C and D) a non-stoichiometric oxygen-carrier material ($La_{0.7}Sr_{0.3}FeO_{3-\delta}$). Note that at 817° C. the equilibrium constant of the water-gas shift reaction is unity and thermodynamically a water to hydrogen ratio is equivalent to the same carbon dioxide to carbon monoxide ratio. In the left-hand column the equilibrium degree of reduction of the oxygen-carrier material, $\delta$, is shown as a function of gas phase conditions. In the right-hand column the structure of the oxygen-carrier material is represented. The metal/metal oxide system can never produce low (below unity) water to hydrogen ratios from a water feed. (A) carbon monoxide fed to the metal oxide bed causes the material to reduce from metal oxide to metal, a to b, and $\delta$ to increase. The carbon dioxide to carbon monoxide ratio in the outlet gas will be unity at equilibrium as long as some metal oxide remains in the bed. (B) when water is fed to the opposite end of the bed the metal begins to reoxidise from b to a. In the outlet gas a water to hydrogen ratio of unity will be achieved. (C) carbon monoxide fed to the non-stoichiometric oxygen-carrier material bed causes the material to reduce from c to d and $\delta$ to increase. As initially the outlet gases leave in contact with an oxidised non-stoichiometric material they exhibit a high carbon dioxide to carbon monoxide ratio (much in excess of unity). (D) when water is fed to the opposite end of the bed the material begins to reoxidise from d to c. Again as the outlet gases leave in contact with a reduced non-stoichiometric material they exhibit a low water to hydrogen ratio (below unity).
Figure 1:
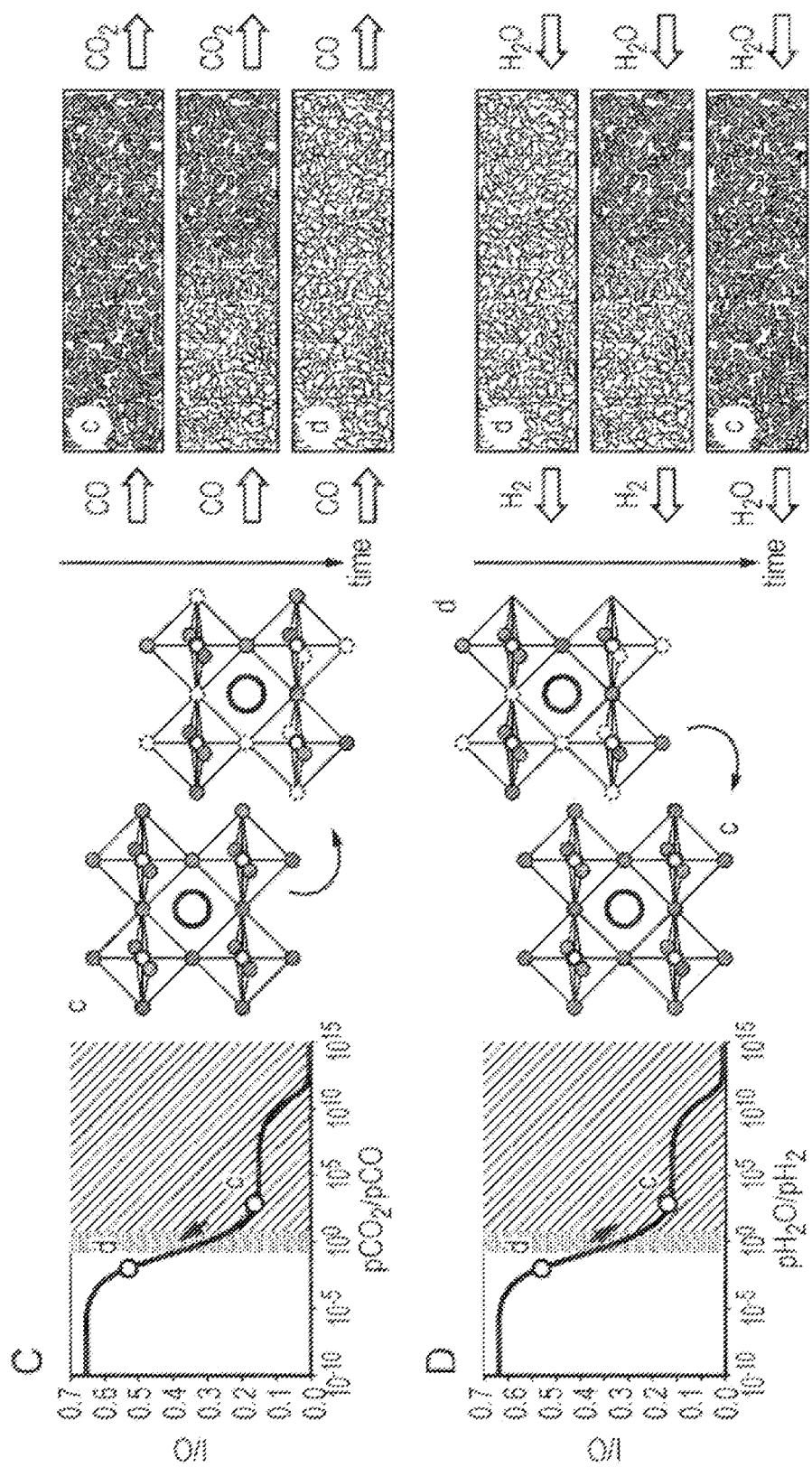

A non-stoichiometric material is one in which the element X is present with a non-integral value. The non-stoichiometric materials suitable for use in the methods of the invention have a variable degree of non-stoichiometry. Thus, they have the general formula $M_n X_{p(1-q)}$ where n and p are integers required for stoichiometric bonding between M and X and $0<q<1$ or $0>q>-1$; wherein the material is able to adopt a range of values of q; and wherein M may represent independently at each occurrence a single element or a mixture of more than one element. The material will be selected such that the value of q varies according to the chemical environment to which the material is exposed.

Thus, the degree of non-stoichiometry of X may be continuous. In other words it may be that the gradient of the curve of X content versus X chemical potential never has an infinite value. Thus, it may be a material that undergoes no phase transitions as it accepts or donates more of the element X. Alternatively, it may be a material that undergoes a large number of phase transitions as it accepts or donates the element X. Thus, it may be that the material undergoes four or more phase transitions as it accepts or donates the element X (e.g. 6 or more phase transitions or 10 or more phase transitions). It may be, therefore, that the non-stoichiometric material used in the methods of the invention either exhibits no phase transitions as it accepts or donates the element X or it exhibits four or more phase transitions.

The invention excludes from its scope the non-stoichiometry that naturally results from the randomly occurring thermodynamic defects in a bulk crystal. It may be that q has a value from 0.01 to 0.99. It may be that q has a value from 0.05 to 0.95. Thus it may be that q has a value from 0.1 to 0.9.

Where M represents multiple elements, it may be that the elements are present in integer proportions relative to each other or it may be that they are not. Thus where M represents two different elements $M^a$ and $M^b$, $M_n$ could be represented as $M^a_{n1} M^b_{n2}$, where n1 and n2 are integers and the sum of n1 and n2 is n. Alternatively it may be that n1 and n2 are not integers and the sum of n1 and n2 is 1. Likewise, where M represents a mixture of three elements $M^c$, $M^d$ and $M^e$, $M_n$ could be represented as $M^c_{n3} M^d_{n4} M^e_{n5}$ where n3 is an integer and where the sum of n4 and n5 is an integer and where the sum of n3, n4 and n5 is n. M may represent two or more different elements. M may represent up to four different elements.

Metallic elements include: Li, Be, Na, Mg, K, Ca, Sc, Ti, V, Cr, Mn, Fe, Co, Ni, Cu, Zn, Al, Rb, Sr, Y, Zr, Nb, Mo, Ru, Rh, Pd, Ag, Cd, In, Sn, Sb, Cs, Ba, La, Ce, Pr, Nd, Sm, Eu, Gd, Tb, Dy, Ho, Er, Th, Yb, Lu, Hf, Ta, W, Re, Os, Ir, Pt, Au, Hg, Tl, Pb and Bi.

Illustrative perovskites are of the form $ABO_3$ where A and B are metallic elements. It may be that A is a lanthanide element and B is a transition metal. A lanthanide, or rare earth element, is an element between atomic number 57 (lanthanum) and atomic number 71 (lutetium) in the Periodic Table of the Elements as specified by IUPAC. Typically, yttrium (atomic number 39) is included within the lanthanide group. An exemplary lanthanide is lanthanum. Exemplary transition metals include titanium, vanadium, chromium, manganese, iron, cobalt, nickel, copper and zinc.

The A component and/or the B component of a perovskite may be doped with other materials to enhance stability and performance. Thus, the A component may be doped with an alkaline earth metal, e.g. strontium. The B component may be doped with aluminium.

An 'organic molecule' refers to any compound comprising both carbon and hydrogen. Organic molecules may also comprise other elements, e.g. oxygen, nitrogen and sulphur. Exemplary organic molecules include hydrocarbons, alcohols (e.g. methanol), carboxylic acids (e.g. acetic acid or fatty acids), aromatic compounds (e.g. benzene, toluene), ketones (acetone), aldehydes, etc. The methods of the invention can be applied to mixtures of organic molecules, e.g. naphtha or bioreactor product mixtures.

A 'hydrocarbon' refers to a compound having the general formula $C_aH_{2a+2}$. The hydrocarbon may be a $C_1$-$C_6$ hydrocarbon, i.e. a hydrocarbon of the above mentioned general formula where a is from 1 to 6, or a $C_1$-$C_4$ hydrocarbon, i.e. a hydrocarbon of the above mentioned general formula where a is from 1 to 4. Exemplary hydrocarbons include methane, ethane and propane.

In principle the 'unmixed' reaction processes of the invention are not subject to the equilibrium limitations associated with a conventional mixed reactions.

An oxygen-carrier material which exhibits a single phase transition can never be used to overcome equilibrium limitations. FIG. 1B (left column) shows the equilibrium oxygen content of a metal/metal oxide system as a function of the water to hydrogen ratio in the gas phase to which it is exposed. The phase change and hence oxygen uptake and release occurs at one single value of the water to hydrogen ratio i.e. there is a discontinuity in oxygen content of the oxygen-carrier material as a function of oxygen chemical potential. The extra reducing potential of the carbon monoxide feed stream is wasted by having a material that cannot reflect this reducing potential; the material lacks a memory of the conditions to which it has been exposed and a thermodynamic irreversibility has been introduced. What is needed to overcome equilibrium limitations is a material that does not have such a discontinuity in its oxygen content as a function of oxygen chemical potential. This material will thus have a 'memory' of the nature of e.g. the reducing gas to which it has been exposed. As a result there is no loss of information on reaction. Such materials can be found and an example is non-stoichiometric solids or in this case non-stoichiometric oxides. FIG. 1D (left column) shows the value of δ (the degree of non-stoichiometry) As can be seen δ varies continuously as the oxidation state of iron in the perovskite lattice changes. This means that if a reducing gas is used with a particular water to hydrogen ratio we should, in principle, be able recover the same water to hydrogen ratio in the product (see Example 1 for a more detailed thermodynamic analysis).

Figure 2:
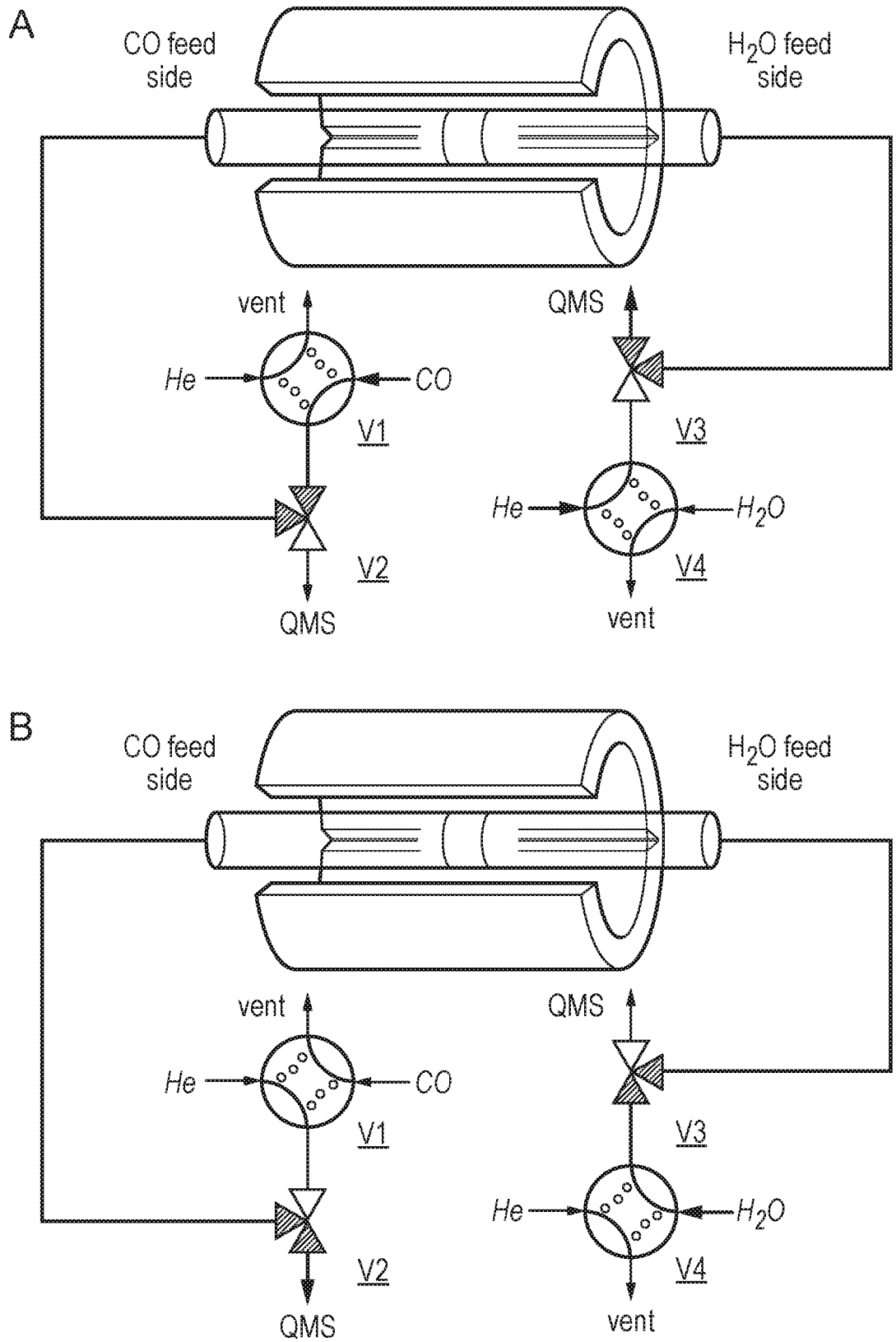
FIG. 2 shows a schematic of the fixed bed reverse flow integral reactor consisting of a quartz tube with a bed of oxygen-carrier material held in place by quartz wool. The oxygen-carrier material was placed in the centre of a furnace and entirely in its isothermal zone. (A) shows valve positions for delivery of carbon monoxide, (B) shows valve positions for delivery of water. Note that four-way valves mean that reactant flows are continuous even when not being delivered to the reactor.

Water-gas shift was performed in a fixed bed reactor (FIG. 2) operated close to plug flow (i.e. with a time constant associated with mixing in the gas phase much less than the duration of reactant pulses) and packed with a non-stoichiometric LSF oxygen-carrier material (see Example 2). It must be emphasised that a fixed bed reactor (no solids mixing) is used. A fluidised bed reactor (a common way to implement chemical looping) will have good solids mixing, undesirable in the present context because this solids mixing will erase the 'memory' that the solid has of the gas phase to which it was exposed. The oxygen-carrier material was repeatedly reduced in carbon monoxide (FIG. 2A) and oxidised in water after reversing the direction of flow (FIG. 2B). One hundred complete redox cycles with 5 mol % carbon monoxide in an inert carrier, helium, and 5 mol % water in helium at 820° C. (this temperature is sufficiently close to 817° C. to mean that the water-gas-shift equilibrium constant is approximately unity) and atmospheric pressure were performed over pre-reduced LSF. Industrially this reaction would be performed at higher carbon monoxide and water partial pressures. However, the equilibrium constant is pressure independent so we may demonstrate the principle of overcoming equilibrium limitation at any pressure and inlet mole fraction.

As an indicator that equilibrium has been overcome, we evaluate for each cycle a variable, K*, which is the minimum equilibrium constant which would be required to reach the time-averaged (averaged over a full cycle) outlet partial pressures, $\bar{p}_i$, or mole fractions, $\bar{x}_i$, $$K^* = \frac{\bar{p}_{CO_2}\bar{p}_{H_2}}{\bar{p}_{CO}\bar{p}_{H_2O}} = \frac{\bar{x}_{CO_2}\bar{x}_{H_2}}{\bar{x}_{CO}\bar{x}_{H_2O}} \quad (1)$$

Figure 3:
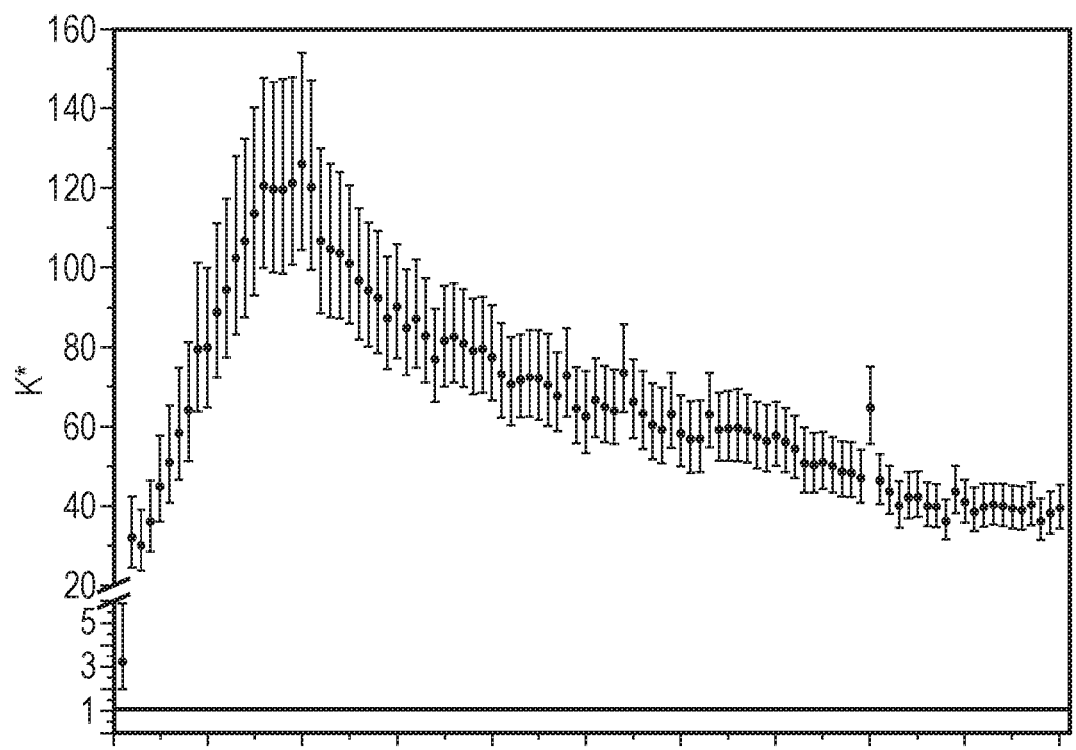
FIG. 3 shows the evolution of K* (defined below) versus cycle number (note broken y-axis) over an initially prereduced LSF oxygen-carrier material. Reduction half cycles use 5 mol % carbon monoxide in helium for a duration of 60 seconds. Oxidation half cycles use 5 mol % water in helium for a duration of 60 seconds. Between half cycles the reactor was purged with helium (120 seconds). A temperature of 820° C. was used. The total flow rate was constant throughout at $3.7\times10^{-5}$ mol/s (50 ml (STP)/min). (B) shows the evolution of the final outlet partial pressure ratios (log scale) from the half cycles versus cycle number.
Figure 3:
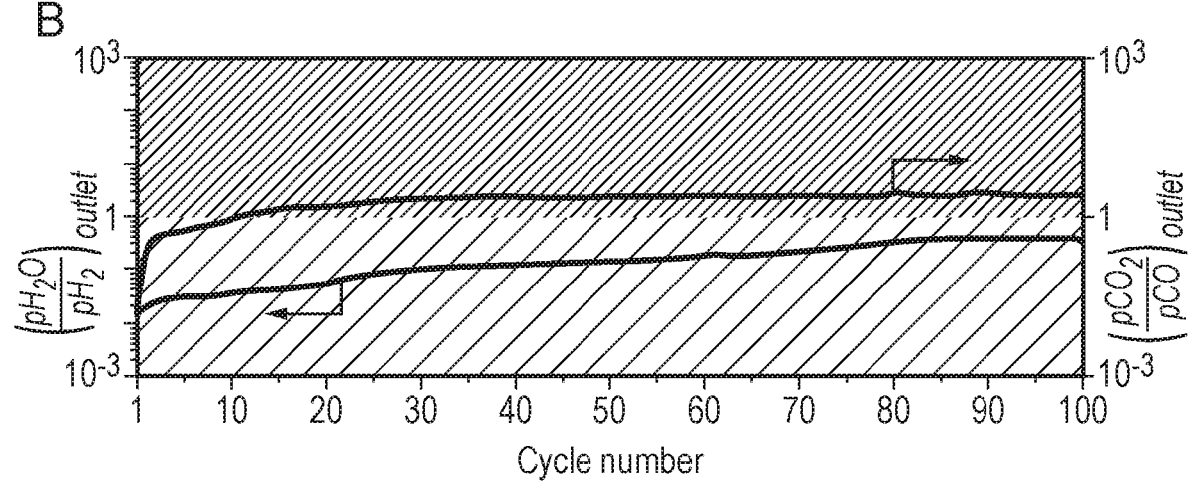
Figure 4:
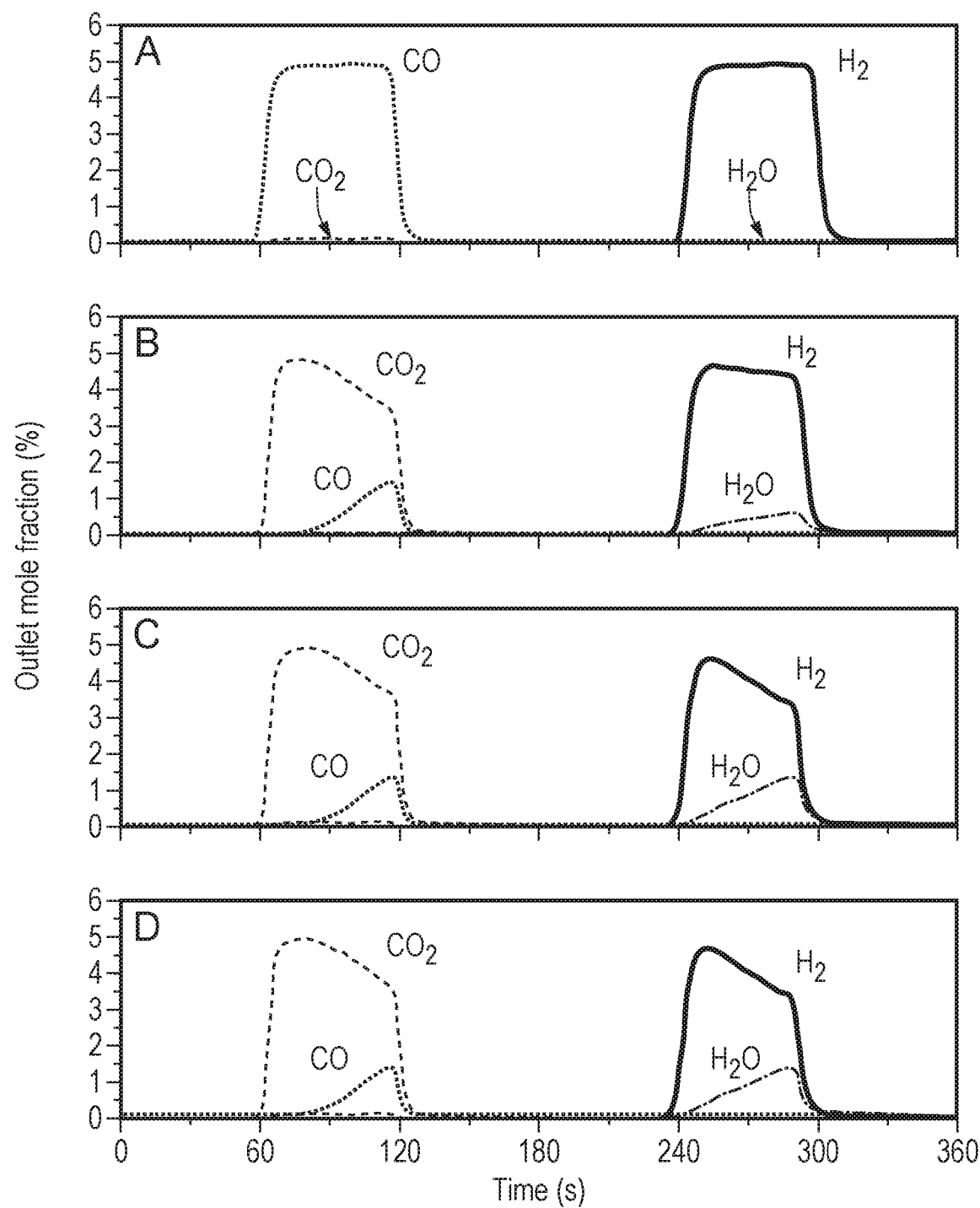
FIG. 4 shows the evolution of the outlet mole fractions versus time using prereduced LSF. (A) shows the outlet mole fractions for Cycle 1; (B) for Cycle 50; (C) for Cycle 90; and (D) for Cycle 99. Cycles 90 and 99 are indistinguishable and cycles are repeatable. Reduction half cycles use 5 mol % carbon monoxide in helium for a duration of 60 seconds. Oxidation half cycles use 5 mol % water in helium for a duration of 60 seconds. Between half cycles the reactor was purged with helium to ensure that the effects of the half cycles did not overlap. A temperature of 820° C. was used. The flow rate was constant throughout at $3.7\times10^{-5}$ molts (50 ml (STP)/min).

For a conventional mixed-reactant reactor, K* would never be able to exceed the water-gas-shift equilibrium constant, unity at this temperature. Likewise K* can never exceed unity for an oxygen-carrier material with a single-phase-transition. Nevertheless, it is possible to achieve K* values of greater than unity in the LSF oxygen-carrier material-containing reverse flow integral reactor under repeatable cycles (see FIG. 3A). On the first cycle a K* of close to unity is expected as the bed prior to this has been reduced to a uniform oxygen chemical potential. When water is introduced, oxidation at the water front begins; the water stream leaves in, or close to, equilibrium with the bed (as the bed has been prereduced this corresponds to a high conversion to hydrogen). Thus the evolution of the state of the oxygen-carrier material can be followed through the outlet water to hydrogen and carbon dioxide to carbon monoxide ratios (FIG. 3B). FIG. 4A shows the water and hydrogen mole fractions produced in the first cycle. When carbon monoxide is introduced from the other end of the bed little carbon dioxide can be formed (FIG. 4A) because of the reduced nature of the oxygen-carrier material. Under repeated cycling the bed close to the water inlet will gradually become oxidised leading to measurable carbon monoxide conversions when flow is reversed (e.g. Cycle 50, FIG. 4B) while still maintaining high water conversions. Under these conditions a maximum in K* is expected (high water conversions with fuel conversion increasing) in agreement with FIG. 3A. As cycles continue, the state of the bed close to the water outlet starts to become more oxidised and the water conversion falls. Eventually, when the cycles become repeatable (e.g. Cycle 90, FIG. 4C and Cycle 99, FIG. 4D), conversions of water and carbon monoxide are similar (as the amount of oxidation in a water half cycle must equal the reduction in a carbon monoxide half cycle) and K* has a steady value. The conversion to hydrogen is around 85% while carbon monoxide conversion is also around 85% (e.g. Cycle 90, FIG. 4C and Cycle 99, FIG. 4D). The steady value of K* here is around 40 (e.g. Cycles 90-100, FIG. 3) and it is quite clear that equilibrium limitations have been overcome. In fact K* is greater than unity for every individual cycle.

Figure 9:
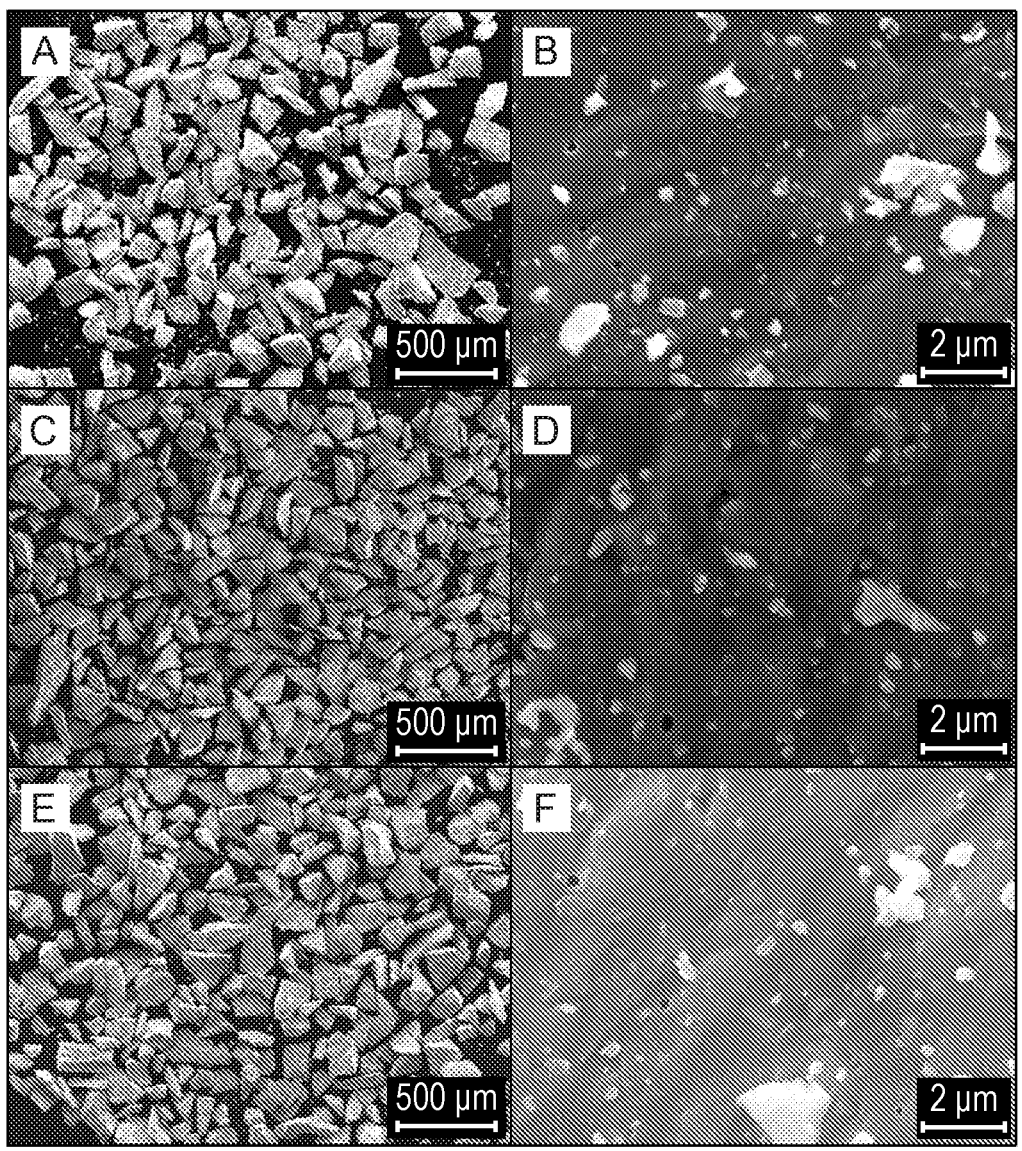
FIG. 9 shows SEM pictures at two different magnifications. (A) and (B) show fresh LSF oxygen-carrier material after calcination in air, (C) and (D) show LSF oxygen-carrier material after prereduction with 5 mol % carbon monoxide in helium for $4.32 \times 10^4$ s (12 hours) at 820° C., and (E) and (F) show the central section (of five sections of equal length) from the reactor bed of LSF oxygen-carrier material after prereduction with 5 mol % carbon monoxide in helium for $4.32 \times 10^4$ s (12 hours) and a further one hundred redox cycles using 5 mol % carbon monoxide in helium and 5 mol % water in helium at 820° C.
Figure 10:
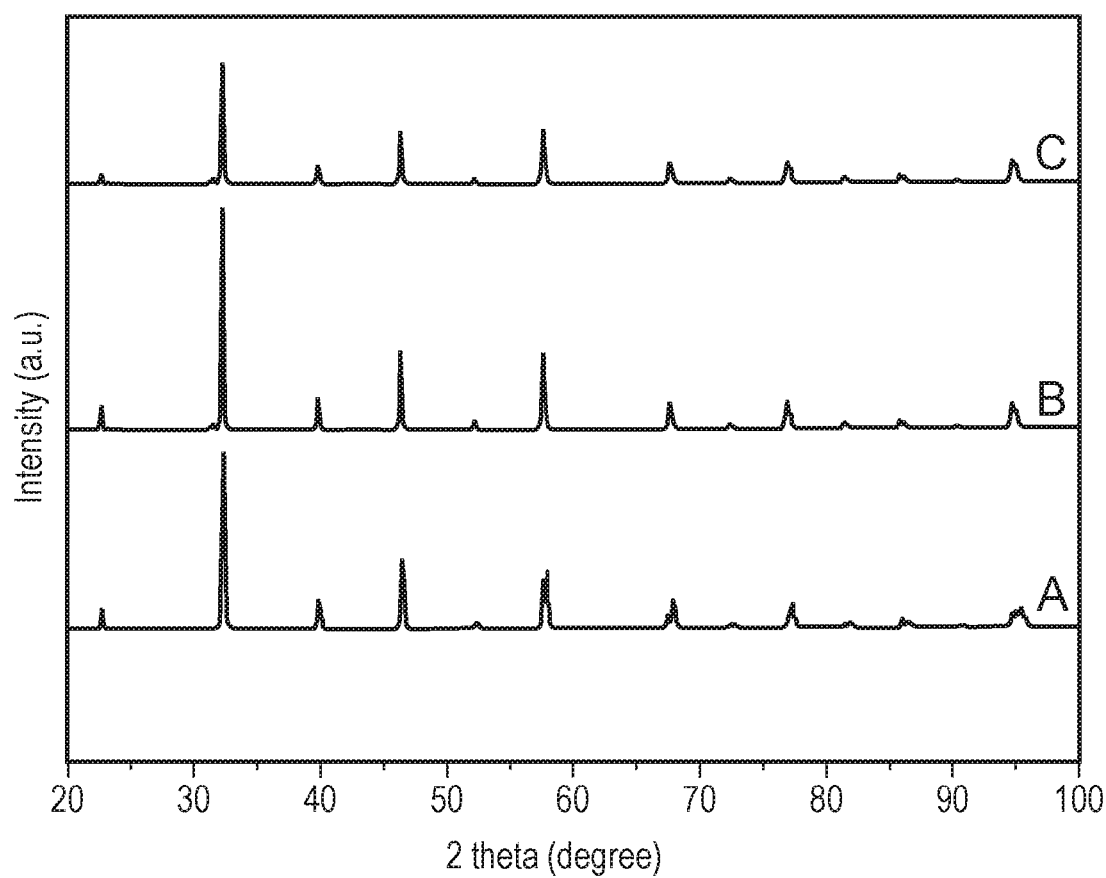
FIG. 10 shows X-ray diffraction of LSF sample at different stages in an experiment. (A) shows fresh LSF oxygen-carrier material after calcination in air, (B) shows LSF oxygen-carrier material after prereduction with 5 mol % carbon monoxide in helium for $4.32 \times 10^4$ s (12 hours) at 820° C., and (C) shows the central section (of five sections of equal length) from the reactor bed of LSF oxygen-carrier material after prereduction with 5 mol % carbon monoxide in helium for $4.32 \times 10^4$ s (12 hours) and a further one hundred redox cycles using 5 mol % carbon monoxide in helium and 5 mol % water in helium at 820° C.

From a practical point of view the stability of oxygen-carrier materials is an important issue that may limit the adoption of chemical looping processes. A contributor to oxygen-carrier material instability is the common use of materials that undergo a phase change. However, here the LSF oxygen-carrier material is designed to remain within the perovskite phase. Indeed SEMs and XRDs of the LSF oxygen-carrier material before and after cycling (FIGS. 9 and 10) show no noticeable evolution in structure. Furthermore, sectioning of the final LSF oxygen-carrier material fixed bed into five equal sections showed no axial variation in the properties of the LSF oxygen-carrier material (see Example 2).

Figure 5:
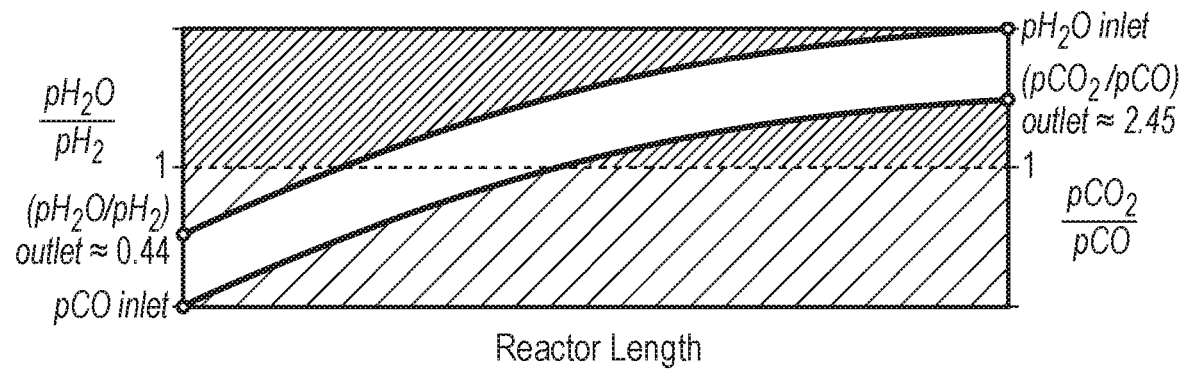
FIG. 5 shows a schematic representation of the oxygen-carrier material state at the end of reducing and oxidising half cycles during repeatable cycling. The reducing feed is introduced from the left and oxidising feed from the right. The numerical values associated with the gas composition ratios (on a logarithmic scale) are those corresponding to the final gas outlet composition and thus assume that the solid is in equilibrium with the gas phase. Note that the inlet conditions are not well defined thermodynamically and are merely representative. The faster water oxidation kinetics compared to carbon monoxide reduction kinetics (see Example 3) means that the bed will overall be more oxidised than otherwise expected and explains the curvature in the profiles.

FIG. 5 visualises how the state of the oxygen-carrier material is expected to change between reducing and oxidising cycles. The change in the average degree of non-stoichiometry (averaged over the whole bed) of the LSF on going from an oxidised bed to a reduced bed can be calculated from an oxygen balance on the gas phase. After the cycles became repeatable, at around Cycle 90, the change in the average degree of non-stoichiometry between oxidation and reduction, stabilises at approximately 0.003. Hence it appears that a relatively small fraction of the available oxygen in the bed is being utilised. This fraction could be increased by using a material if higher surface area or conditions under which oxygen solid state transport is more rapid thus removing oxygen from the oxygen-carrier material surface more quickly. In addition increasing the bed residence time would permit higher conversions to hydrogen over a greater duration.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

EXAMPLE 1

Thermodynamic Analysis

Carbon monoxide and water are mixed and fed to a conventional reactor where the water-gas shift reaction occurs, $$CO + H_2O \leftrightarrow CO_2 + H_2 \quad (S1)$$

If the reaction kinetics are fast enough that the gases equilibrate then, $$\frac{1}{K}\left(\frac{p_{CO_2}}{p_{CO}}\right)_{outlet} = \left(\frac{p_{H_2O}}{p_{H_2}}\right)_{outlet} \quad (S2)$$

where the reactor partial pressures, $p_i$, evaluated at the outlet are governed by the equilibrium relationship for the water-gas shift reaction.

In the case of the water-gas shift reaction performed by chemical looping the reaction scheme would involve:

$$CO + O(OCM) \rightarrow CO_2 \quad (S3)$$

$$H_2O \rightarrow H_2 + O(OCM) \quad (S4)$$

where O(OCM) is oxygen associated with the oxygen-carrier material. Separate streams of hydrogen (in water) and carbon dioxide (in carbon monoxide) are produced.

In the case of an oxygen-carrier material which exhibits a single phase transition, the chemical looping reactor outlet partial pressures are governed by the equilibrium relationship, $$\frac{1}{K}\left(\frac{p_{CO_2}}{p_{CO}}\right)_{outlet} = \left(\frac{p_{H_2O}}{p_{H_2}}\right)_{outlet} = \frac{1}{K}\left(\frac{p_{CO_2}}{p_{CO}}\right)_{PT} = \left(\frac{p_{H_2O}}{p_{H_2}}\right)_{PT} \quad (S5)$$

and at 817° C. where the equilibrium constant is unity, $$\left(\frac{p_{CO_2}}{p_{CO}}\right)_{outlet} = \left(\frac{p_{H_2O}}{p_{H_2}}\right)_{outlet} = \left(\frac{p_{CO_2}}{p_{CO}}\right)_{PT} = \left(\frac{p_{H_2O}}{p_{H_2}}\right)_{PT} \quad (S6)$$

where PT denotes the phase transition associated with the oxygen-carrier material. Equations (S2) and (S5) contain common elements and thus equilibrium limitations cannot be overcome with an oxygen-carrier material exhibiting one phase transition.

Now consider water-gas shift performed by chemical looping in a fixed bed reactor packed with a non-stoichiometric oxide. If equilibrium is achieved between gas and solid at the inlet to the bed on reduction and at the outlet of the bed on oxidation (the same location in the reactor) then, $$\frac{1}{K}\left(\frac{p_{CO_2}}{p_{CO}}\right)_{inlet} = \left(\frac{p_{H_2O}}{p_{H_2}}\right)_{outlet} \quad (S7)$$

and at 817° C., $$\left(\frac{p_{CO_2}}{p_{CO}}\right)_{inlet} = \left(\frac{p_{H_2O}}{p_{H_2}}\right)_{outlet} \quad (S8)$$

Note the difference between Equation (S7) and Equations (S2), (S5). If we mix the reducing and oxidising gases, the outlet gases are all in equilibrium with one another (Equation (S2)). If we use an oxygen-carrier material with a single phase transition, likewise, the best we can hope for is for the outlet gases to be in equilibrium with one another (Equation (S2)). If we use reverse flow with a non-stoichiometric oxygen-carrier material, our outlet gas at the start of the oxidation phase is in equilibrium with the inlet gas from the reducing phase (Equation (S7)). This means that if we have a low carbon dioxide to carbon monoxide ratio in the reducing feed, we can achieve that same low water to hydrogen ratio in our product stream from the oxidation phase. By avoiding mixing of the gases, using reverse flow operation in a fixed bed (no solids mixing), and using a material with a continuous variation in non-stoichiometry with water to hydrogen ratio, we are able to achieve higher hydrogen mole fractions in the product stream approaching full conversion.

EXAMPLE 2

Materials and Methods

The non-stoichiometric perovskite-type material lanthanum strontium ferrite ($La_{0.7}Sr_{0.3}FeO_{3-\delta}$ or LSF) was used as an oxygen-carrier material. This material is non-stoichiometric with the equilibrium degree of non-stoichiometry, $\delta$, determined by the water to hydrogen partial pressure ratio to which the material is exposed. The two reactions that control the degree of non-stoichiometry in the LSF are the oxidation and disproportionation of Fe(III) to Fe(II) and Fe(IV). Using Kröger-Vink notation these reactions can be written as, $$V_O^{\bullet\bullet} + 2Fe_{Fe}^{\times} + \frac{1}{2}O_2 \leftrightarrow O_O^{\times} + 2Fe_{Fe}^{\bullet} \quad (S9)$$

$$2Fe_{Fe}^{\times} \leftrightarrow Fe_{Fe}^{\bullet} + Fe_{Fe}^{\prime} \quad (S10)$$

And the equilibrium constants for these reactions can be defined as, $$K_{ox} = \frac{[O_O^{\times}][Fe_{Fe}^{\bullet}]^2}{p_{O_2}^{\frac{1}{2}}[Fe_{Fe}^{\times}]^2 \delta} \quad (S11)$$

$$K_{Fe} = \frac{[Fe_{Fe}^{\bullet}][Fe_{Fe}^{\prime}]}{[Fe_{Fe}^{\times}]^2} \quad (S12)$$

where the square brackets refer to average number of species per unit cell. Rather than employ an oxygen partial pressure, a water to hydrogen partial pressure ratio that would be in equilibrium with that oxygen partial pressure can be used, $$p_{O_2}^{\frac{1}{2}} = K_{wat} \frac{p_{H_2O}}{p_{H_2}} \quad (S13)$$

where $K_{wat}$ is the equilibrium constant for water dissociation:

$$H_2O \rightarrow \frac{1}{2}O_2 + H_2 \quad (S14)$$

Using these equations (S11) to (S14) it can be shown that, $$\frac{\delta^{\frac{1}{2}}(2\delta - x + 1)}{(3-\delta)^{\frac{1}{2}}(2\delta - x)} \frac{K_{wat}^{\frac{1}{2}} p_{H_2O}^{\frac{1}{2}}}{p_{H_2}^{\frac{1}{2}}} = \quad (S15)$$

$$\frac{K_{Fe}}{K_{ox}} \frac{(1+x-2\delta)(3-\delta)^{\frac{1}{2}}}{\delta^{\frac{1}{2}}(2\delta - x)} \frac{p_{H_2}^{\frac{1}{2}}}{K_{wat}^{\frac{1}{2}} p_{H_2O}^{\frac{1}{2}}} - K_{ox}^{-\frac{1}{2}}$$

Figure 6:
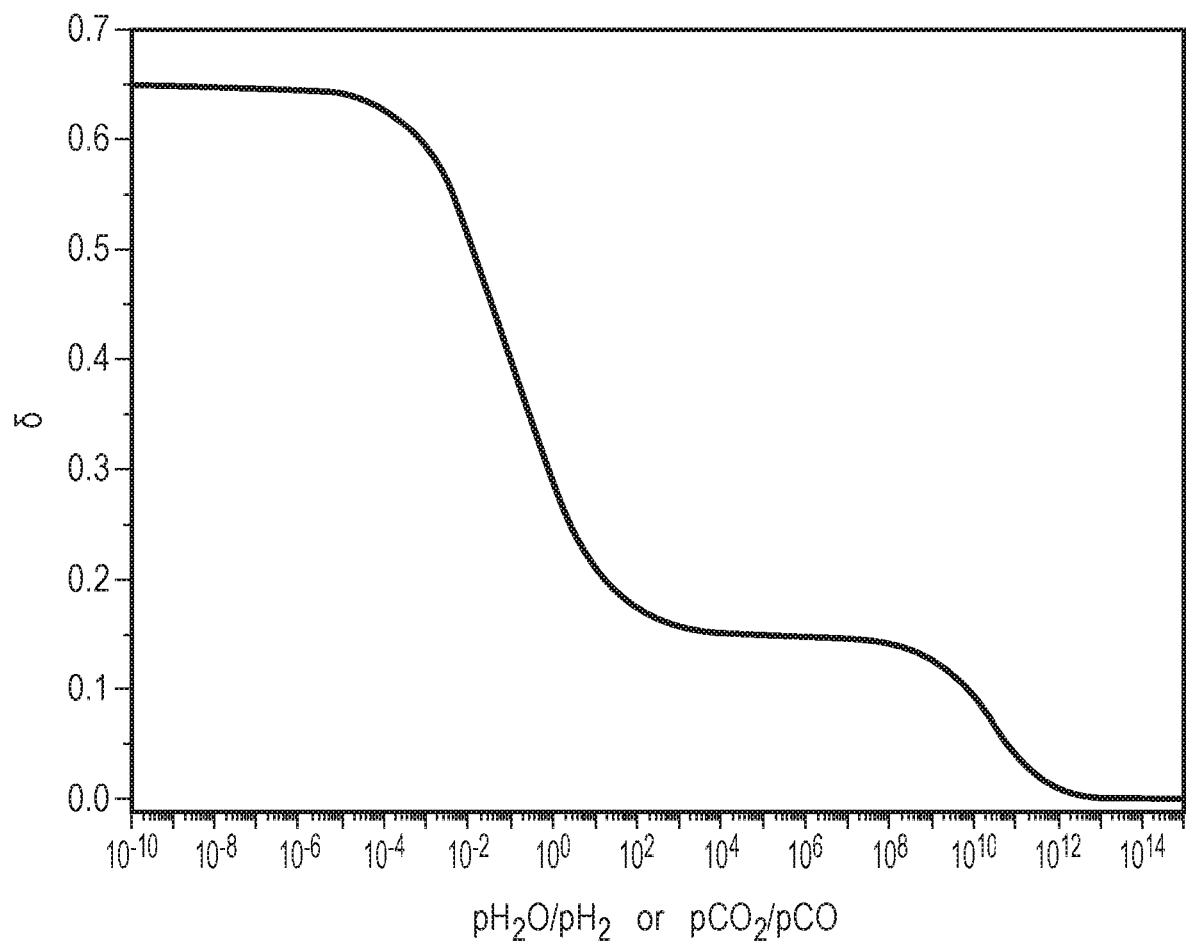
FIG. 6 shows the equilibrium value of $\delta$ at 817° C. for $La_{0.7}Sr_{0.3}FeO_{3-\delta}$ as a function of water to hydrogen or carbon dioxide to carbon monoxide partial pressure ratio.

This equation is used with the equilibrium constants to plot FIG. 6.

Figure 7:
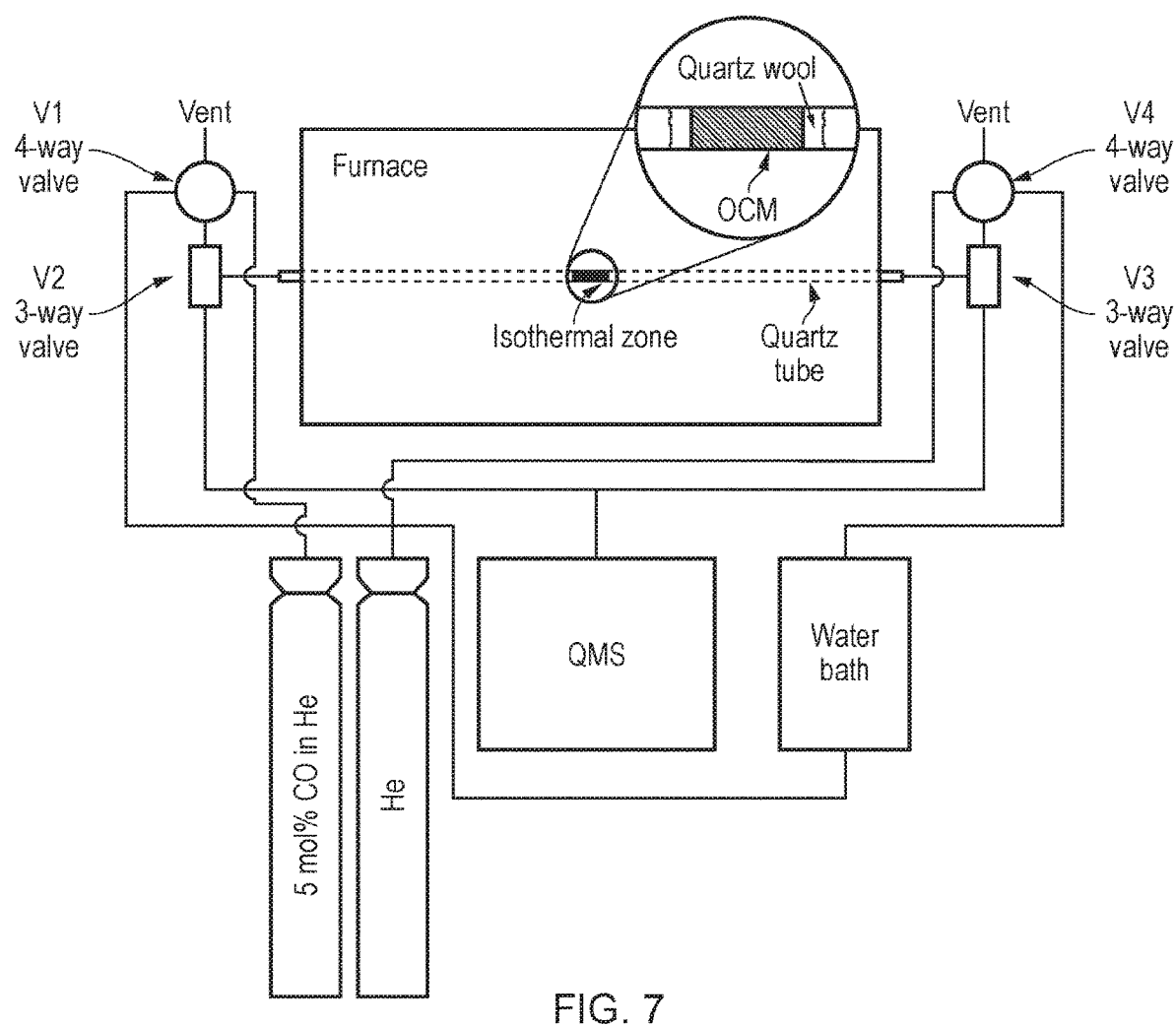
FIG. 7 shows a flow diagram for the integral reactor apparatus. Valves V1, V2, V3 and V4 control the nature and direction of the gas flow to the packed bed integral reactor. 5 mol % carbon monoxide in helium is delivered directly from a certified cylinder (5.03 mol % carbon monoxide in helium, BOC, UK) to the reactor bed. 5 mol % water in helium is delivered by saturating helium (99.996% pure, BOC, UK) in a water bath saturator system. The oxygen-carrier material is held in the central isothermal zone of the furnace by quartz wool.

Commercial powders of LSF (Praxair Speciality Ceramics, LSF has a molecular weight of 227.4 g/mol and density of $1.26 \times 10^3$ kg/m³) were pelletized with a hydraulic press, followed by sintering at 1250° C. for $4.32 \times 10^4$ s (12 hours) in air. These pellets were subsequently crushed and sieved to obtain the desired particle size (80-160 μm). The resulting particles are referred to as fresh particles. The particles (6 g ($2.62 \times 10^{-2}$ mol)) were then placed in a quartz tube of 1 m length and 8 mm internal diameter; the particles were held in place by quartz wool. The particles were located in the isothermal zone (the temperature and isothermality of which was confirmed by using an additional movable thermocouple) of a furnace (as shown in FIG. 7).

Outlet gases containing carbon monoxide, carbon dioxide, water, hydrogen and helium were fed into a soft ionisation quadrupole mass spectrometer (QMS) (QGA Quantitative Gas Analysis unit, Hiden Analytical Ltd., UK) through a heated capillary line for continuous online analysis. The QMS was calibrated for water against a cold mirror dew point hygrometer (CMH-1, 182 Alpha Moisture Systems, UK). Uncertainty in the measured mole fractions was estimated to be ±2% of the measured mole fraction. In addition the QMS has a resolution of approximately 100 ppm.

Prior to cycling the particles were reduced in 5 mol % carbon monoxide in helium (certified 5.03 mol % carbon monoxide in helium, BOC, UK) for $4.32 \times 10^4$ s (12 hours) at 820° C. As the LSF had previously been calcined in air at 1250° C. and then cooled in air to room temperature we would expect the post-calcination LSF (before reduction) to have a uniform $\delta$ of approximately 0.15 because of the significant plateau in $\delta$ versus $p_{H_2O}/p_{H_2}$ (for example air has an effective $p_{H_2O}/p_{H_2}$ of $4.7 \times 10^8$ at 820° C.). On prereduction we would expect $\delta$ to have a value of approximately 0.5 or higher, as in the first cycle the $p_{H_2O}/p_{H_2}$ produced is approximately 0.01. Hence we would expect, on prereduction, the change in the degree of non-stoichiometry, $\Delta\delta$, to be in excess of +0.35. An oxygen balance performed over this prereduction period using the outlet molar rates of carbon dioxide integrated over the half cycle time yielded a $\Delta\delta$ of +0.09±0.002. This indicates that not all of the LSF is involved in the redox processes with some material kinetically excluded from undergoing reaction.

After reduction the LSF was employed for 100 cycles for chemical looping in reverse flow mode. The reducing (carbon monoxide) and oxidising (water) agents were fed in discrete half cycles with helium purges to separate the half cycles (industrially such purging with inert would not be used and it would be important to ensure that mixing were minimised in the gas phase). The experiments were performed at 820° C. Inlet mole fractions of carbon monoxide and water of 5 mol % in a balance of helium were used with a flow rate of $3.7 \times 10^{-5}$ molts (50 ml (STP)/min) throughout. The outlet pressure of the reactor was approximately 1 bar. The inlet pressure was approximately 1.2 bar due to the pressure drop within the bed (pressure does not affect the equilibrium constant of the water-gas shift reaction). Water was delivered by a saturator system (Grant, 179 UK) using helium (99.996% pure, BOC, UK) as a carrier. Cycles were performed with a half cycle durations of 60 seconds. Purges of helium (99.996% pure, BOC, UK) of 120 seconds were employed.

Cyclic switching between the gases was performed with three- and four-way valves to maintain continuous flow of all reactive gases, as shown in FIG. 2. The switching protocol for a cycle began with Valves V1 and V2 arranged to flow helium into the reactor via the carbon monoxide feed side and Valve V3 arranged to flow the helium leaving the reactor to the QMS. After 60 s, Valve V1 was turned to deliver carbon monoxide for 60 s and was then turned back to deliver helium. After a further 60 s, helium flow to Valve V1 was stopped; helium flow to Valve V4 was started; and Valves V2 and V3 were turned simultaneously to change the direction of helium flow to enter at the water feed side. After 60 s, Valve V4 was turned to deliver water into the reactor for 60 s, then was turned back to deliver helium for a further 60 s before once again switching the direction of helium flow and repeating the cycle. This protocol has the effect of alternately introducing 60-second pulses (half cycles) of carbon monoxide and water separated by 120 s of helium.

Figure 8:
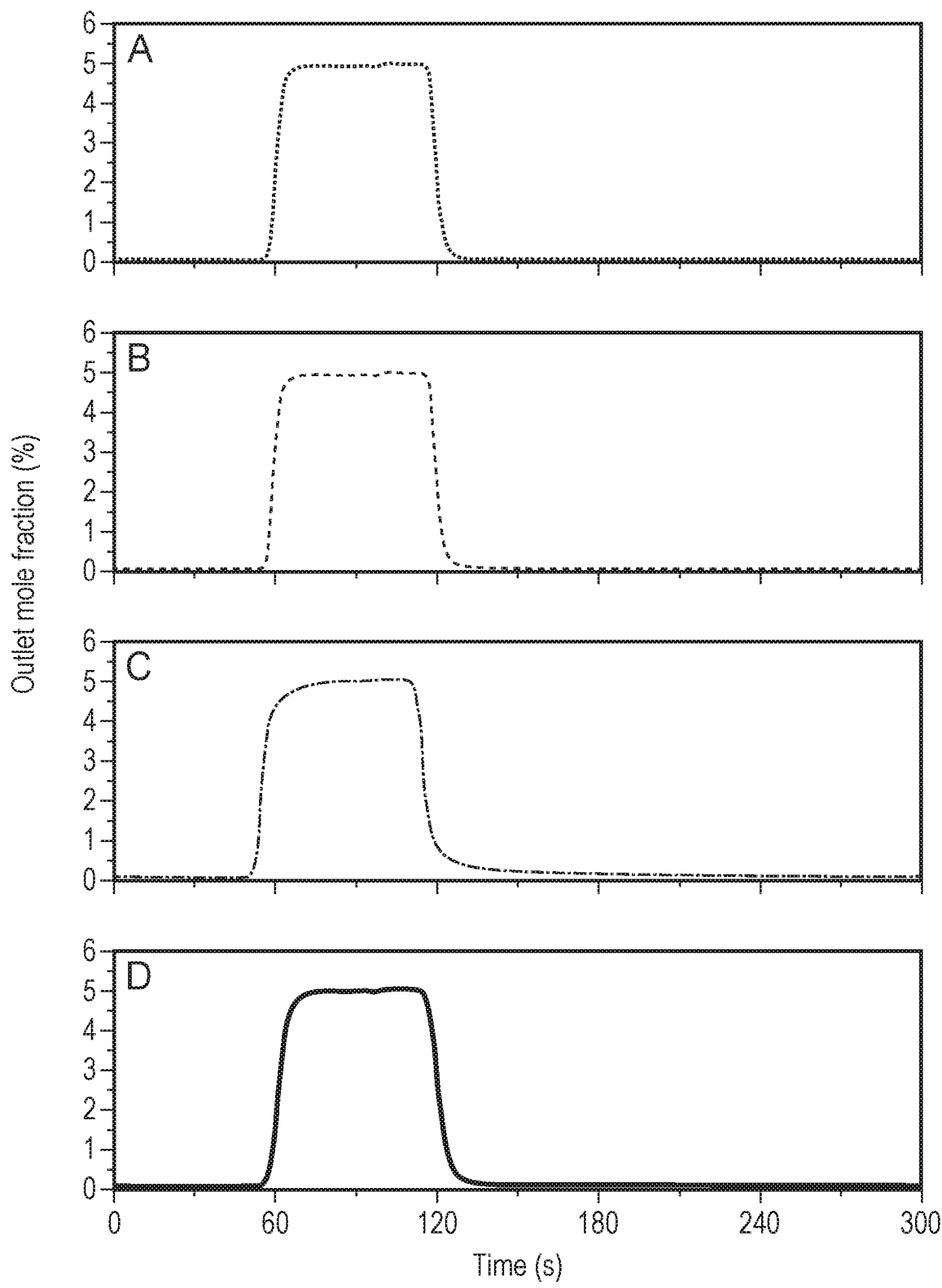
FIG. 8 shows the residence time experiments for (A) 5 mol % carbon monoxide in helium, (B) 5 mol % carbon dioxide in helium, (C) 5 mol % water in helium, and (D) 5 mol % hydrogen in helium. The reactive gas was introduced for a duration of 60 s at a time of 30 s; the total flow rate was constant throughout at $3.7 \times 10^{-5}$ mol/s (50 ml (STP)/min) at 820° C. Bed length was 6 cm (~6 g) of LSF. Prior to residence time experiments with carbon monoxide and hydrogen (A and D) the bed was fully reduced and prior to residence time distributions with carbon dioxide and water (B and C) the bed was fully oxidised.

Residence time experiments (shown in FIG. 8) were performed for each of the reactant and product gases at 5 mol % to confirm that their half cycles would remain discrete during operation. Note that the shape of these outlet mole fraction versus time traces are similar except for water which appears to interact more strongly with the oxygen-carrier material resulting in a more 'rounded' appearance in the outlet mole fraction.

After the cycles became repeatable, at approximately Cycle 90, the change in the average degree of non-stoichiometry, $\Delta\bar{\delta}$, between reduction and oxidation half cycles stabilised at ±0.003 (here we only have information about the change in the average degree of non-stoichiometry, $\Delta\bar{\delta}$, as the bed is no longer of uniform degree of non-stoichiometry). Before cycle repeatability, the extent of LSF oxidation was greater than reduction over a cycle as one might expect when starting with a reduced material. Performing an oxygen balance over all of the cycles yields a change in $\Delta\bar{\delta}$ of −0.09±0.02 which is similar in magnitude to the change in $\delta$ on prereduction and indicates that much of the bed has a $\delta$ of approximately 0.15 with a reduced section of bed expected close to the water exit.

The oxygen-carrier material particles, fresh, after prereduction, and after prereduction followed by one hundred redox cycles, were characterised by SEM-EDX and XRD. After redox cycling the bed was separated into five approximately equal lengths to see if there were any axial differences in the microstructural, compositional, or phase properties. No such axial variations were observed and thus here we only show data for the central oxygen-carrier material fraction (in the case of SEMs and XRDs). BET surface areas were determined by adsorption/desorption of nitrogen at 77 K in a Beckman Coulter SA3100 instrument. The BET surface area of the LSF was approximately 0.1 m$^2$/g. Scanning electron microscopy (SEM) (XL30 ESEM-FEG) was used to study the microstructure of the fresh oxygen-carrier material particles and the effects of operation on the microstructure. As can be seen in FIG. 9A, the fresh particles had an irregular shape. Using a higher magnification (FIG. 9B), a smooth surface was observed with some apparently incomplete sintering. After prereduction and a further 100 cycles, no significant changes were detected in the LSF samples (FIGS. 9C, 9D, 9E and 9F). The particles kept their shape and size, and no significant fines formation was observed nor was material lost from the reactor. X-ray diffraction (PAN analytical X'Pert Pro) was carried out to determine the crystalline phases present in the fresh LSF oxygen-carrier material (FIG. 10A); the LSF oxygen-carrier material after prereduction with 5 mol % carbon monoxide in helium for 4.32×10$^4$ s (12 hours) (FIG. 10B); and the LSF oxygen-carrier material after prereduction with 5 mol % carbon monoxide in helium for 4.32×10$^4$ s (12 hours) and a further one hundred redox cycles using 5 mol % carbon monoxide in helium and 5 mol % water in helium at 820° C. (FIG. 10C). In all cases the only crystalline phase present was consistent with the perovskite phase. There were no noticeable changes in the material on reduction and cycling.

EXAMPLE 3

Differential Kinetics

Differential kinetic measurements were performed in a fully automated and programmable microreactor (CATLAB, Hiden Analytical Ltd., UK) with an integrated soft ionisation quadrupole mass spectrometer (QMS) (QIC-20 Bench-top Gas Analysis unit, Hiden Analytical Ltd., UK) at approximately 1 bar and the slightly higher temperature of 850° C. (FIG. S6). The reactor was operated in the main differentially, that is the conversion of reactants was low (less than 10% apart from when high initial rates of hydrogen production were encountered). The temperature of the sample was monitored and controlled by an internal K-type thermocouple inserted into an inert alumina sleeve. Initially, the fresh sample (~50 mg) post calcination was placed in the reactor before flushing with a helium flow of 7.4×10$^{-5}$ molts (100 ml (STP)/min) prior to commencing testing. After that, the oxygen-carrier material was subjected to isothermal reduction under 5 mol % carbon monoxide in helium and isothermal oxidation under 5 mol % water in helium with flow rates of 7.4×10$^{-5}$ molts (100 ml (STP)/min). Reduction and oxidation steps lasted 1800 s (30 minutes). Helium was flushed for 300 s (5 minutes) after reduction and 900 s (15 minutes) after oxidation in order to evacuate the reactor of any reactive gas or any product and to avoid mixing of the reducing and oxidising gases.

Figure 11:
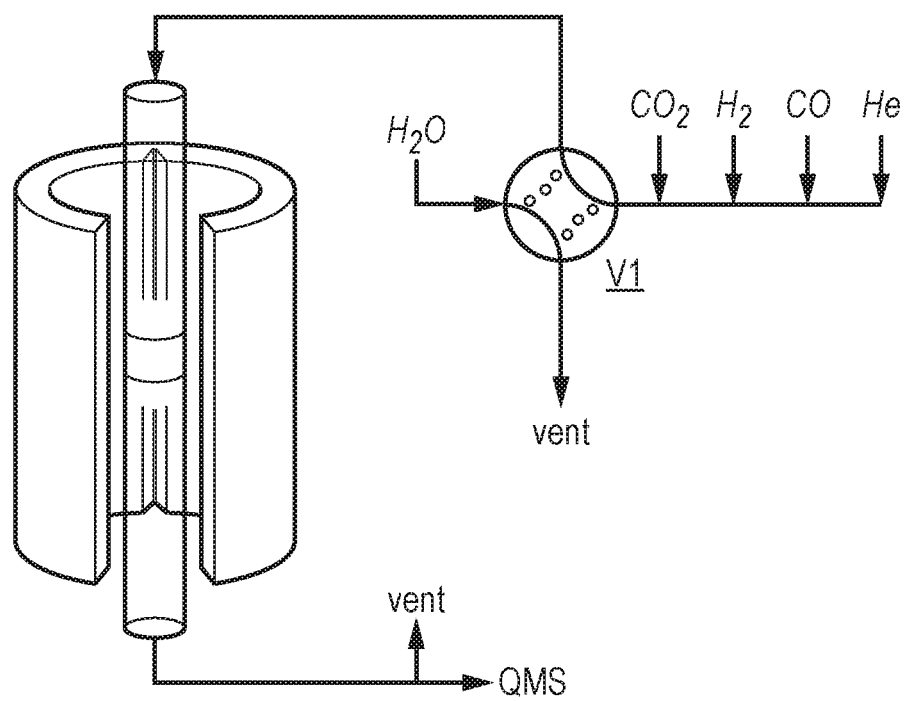
FIG. 11 shows a differential reactor used for kinetic studies. Flow is directed to the reactor via a two-position, four-way Valve, V1. Water flows continuously while the other gases are intermittent. The bed length was typically 0.3 cm (50 mg of LSF oxygen-carrier material) and the internal diameter of the sample tube was approximately 0.38 cm. All piping was trace heated to 120° C. to avoid the condensation of water.
Figure 12:
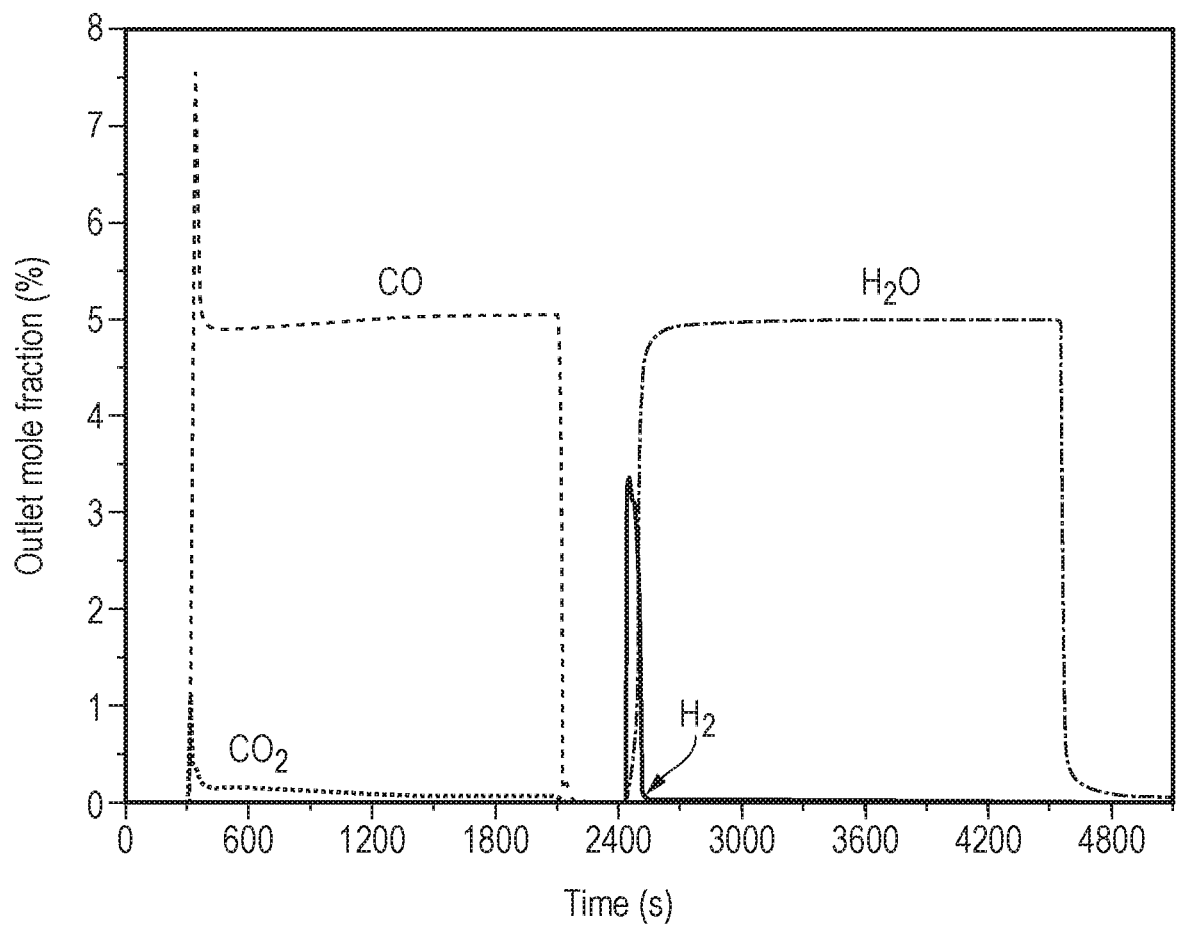
FIG. 12 shows the outlet mole fractions versus time during 'differential' reactor operation. Reduction employs 5 mol % carbon monoxide in helium for a duration of 1800 s (30 minutes). Oxidation employs 5 mol % water in helium for a duration of 1800 s (30 minutes). Between oxidation and reduction the reactor was purged with helium. A temperature of 850° C. was used. The flow rate was constant throughout at $7.4 \times 10^{-5}$ mol/s (100 ml (STP)/min). The LSF sample mass was approximately 50 mg.

FIG. 12 shows the outlet mole fractions over a full cycle of a reduction and oxidation of LSF. Each half cycle lasted approximately 1800 s (30 minutes), but the oxidation half cycle with 5 mol % water in helium is often slightly longer than 1800 s (30 minutes) as there was a delay in the switching of the Valve V1 (FIG. 11) which controls water delivery. The reduction half cycle shows a sharp peak in carbon monoxide mole fraction at short times with a magnitude that is much greater than the 5 mol % carbon monoxide delivered. This peak should be ignored as it is an artefact of the system created by pressure changes on opening and closing of the mass flow controllers for helium, carbon monoxide, hydrogen and carbon dioxide. When water is delivered to the reactor no such peak is observed as the water flows continuously and is directed into the reactor via a two-position, four-way Valve, V1, when required.

The initial rate of carbon dioxide production was ≈0.75 μmol/s but this quickly decreased to ≈0.1 μmol/s in the first 120 s (2 minutes) of the reduction half cycle. Over the remaining 1680 s (28 minutes) the rate of carbon dioxide production continued to drop steadily to a final value of ≈0.05 μmol/s. Hydrogen production, on the other hand, had an initial rate of ≈2.5 μmol/s (there is significant uncertainty in this rate as the microreactor is not in differential mode at such high rates of reaction). This rate was maintained for about 100 s. After this initial high rate of hydrogen production the rate drops to a level that is not measurable. It is clear that hydrogen oxidation proceeds much more readily than carbon monoxide reduction.

EXAMPLE 4

Further Materials

The water gas shift reaction described above was repeated with a range of different non-stoichiometric materials. The results are shown in Table 1:

| Non-stoicheometric Material | Number of Cycles Performed | CO Conversion in last cycle | $H_2O$ Conversion in last cycle | Prereduction? |
|---|---|---|---|---|
| $La_{0.8}Sr_{0.2}FeO_{3-\delta}$ | 70 | 63% | 65% | 4 Hours CO |
| $La_{0.8}Sr_{0.2}Fe_{0.94}Al_{0.06}O_{3-\delta}$ | 100 | 41% | 43% | 12 Hours CO |
| $La_{0.7}Sr_{0.3}FeO_{3-\delta}$ | 100 | 83% | 88% | 12 Hours CO |
| $La_{0.7}Sr_{0.3}FeO_{3-\delta}$ | 100 | 75% | 93% | 12 Hours CO |
| $La_{0.7}Sr_{0.3}FeO_{3-\delta}$ | 110 | 56% | 52% | 12 Hours CO |
| $La_{0.7}Sr_{0.3}Fe_{0.94}Al_{0.06}O_{3-\delta}$ | 100 | 57% | 61% | No |
| $La_{0.6}Sr_{0.4}FeO_{3-\delta}$ | 140 | 84% | 85% | 12 Hours CO |
| $La_{0.6}Sr_{0.4}FeO_{3-\delta}$ | 300 | 83% | 83% | No |
| $La_{0.6}Sr_{0.4}Fe_{0.94}Al_{0.06}O_{3-\delta}$ | 200 | 85% | 85% | No |
| $La_{0.5}Sr_{0.5}FeO_{3-\delta}$ | 100 | 80% | 87% | 12 Hours CO |

All of the materials, except for $La_{0.8}Sr_{0.2}Fe_{0.94}Al_{0.06}O_{3-\delta}$, exhibit greater than 50% conversion in both CO and $H_2O$ cycles i.e. K* is greater than unity.

EXAMPLE 5

Steam Reforming of Methane

The autothermal chemical looping steam-reforming of methane was also performed. The reaction of methane and water is not equilibrium limited in an overall sense but nevertheless it is still difficult to get a high hydrogen to water ratio in a chemical looping process because of the thermodynamics of the oxygen-carrier material. Carriers of variable non-stoichiometry are inherently much more flexible in terms of the processes in which they can be employed to produce high purity separated streams even in the absence of overall equilibrium limitations.

After reduction the LSF was employed for 50 cycles in reverse flow mode. The reducing (methane) and oxidising (water and oxygen) agents were fed in discrete cycles with helium purges to separate the cycles. The order of feeding was methane from the reducing inlet followed by water from the oxidising inlet and finally oxygen from the oxidising inlet. The experiments were performed at 850° C. Inlet mole fractions of methane, water and oxygen of 5 mol % in a balance of helium (a balance of argon in the case of oxygen) were used with a flow rate of $2.2 \times 10^{-5}$ molts (30 ml (STP)/min) throughout. Cycles were performed with a durations of 15 minutes for the methane feed, 6 minutes for the water feed and 30 seconds for the oxygen feed. Purges of helium (99.996% pure, BOC, UK) of 90 seconds were employed. Overall conversions of approximately 35% for methane (producing a mixture of carbon monoxide, carbon dioxide, hydrogen and water), 85% for water and 100% for oxygen were achieved.

The invention claimed is:

1. A method of carrying out a chemical reaction which involves the transfer of an element or group X from one chemical species to another, the method comprising sequentially:
   A) passing a chemical species P through a fixed bed reactor, the chemical species P flowing from a first position of the fixed bed reactor to a second position of the fixed bed reactor, and extracting the resulting chemical species $PX_y$ from the second position of the fixed bed reactor; and then
   B) passing a chemical species $QX_z$ through the fixed bed reactor, the chemical species $QX_z$ flowing from the second position of the fixed bed reactor to the first position of the fixed bed reactor, and extracting the resulting chemical species Q from the first position of the fixed bed reactor;
   C) optionally repeating steps A) and B) in sequence at least once;

wherein P and Q are chemical species which are selected such that both P and Q can accept the element or group X and both $PX_y$ and $QX_z$ can donate the element or group X; y and z are integers; and wherein the fixed bed reactor comprises at least one non-stoichiometric material which has the formula $M_nX_{p(1-q)}$ where n and p are integers required for stoichiometric bonding between M and X and $0<q<1$ or $0>q>-1$; wherein the material is able to adopt a range of values of q; and wherein M represents a single element or a mixture of more than one element.

2. A method of claim 1, wherein greater than 50% of both $QX_z$ and P are converted to Q and $PX_y$ respectively.

3. A method of claim 1, wherein the non-stoichiometric material is a solid.

4. A method of claim 1, wherein P is passed through the reactor in step A) as a mixture with other components.

5. A method of claim 1, wherein $QX_z$ is passed through the reactor in step B) as a mixture with other components.

6. A method of claim 1, wherein P, $PX_y$, Q and $QX_z$ are all gases within the temperature range of the reaction.

7. A method of claim 1, wherein X is an element.

8. A method of claim 7, wherein X is a non-metal.

9. A method of claim 8, wherein X is oxygen.

10. A method of claim 9, wherein Q is $H_2$ and $QX_z$ is $H_2O$.

11. A method of claim 10, wherein P is selected from: CO, $H_2$, at least one organic molecule or a mixture thereof.

12. A method of claim 1, wherein P is CO, $PX_y$ is $CO_2$, Q is $H_2$ and $QX_z$ is $H_2O$.

13. A method of claim 1, wherein P is a mixture of $H_2$ and CO, $PX_y$ is a mixture of $H_2O$ and $CO_2$, Q is $H_2$ and $QX_z$ is $H_2O$.

14. A method of claim 13, the method comprising a step F before step A, step F comprising forming the mixture of $H_2$ and CO by reforming a hydrocarbon.

15. A method of claim 1, wherein P is at least one organic molecule , $PX_y$ is a mixture of CO and $H_2$, Q is $H_2$ and $QX_z$ is $H_2O$.

16. A method of claim 15, wherein the mixture of $H_2$ and CO obtained in step A is subsequently further oxidised to $CO_2$ or $H_2O$ and the heat which is generated during said oxidation is extracted and transferred to the fixed bed reactor.

17. A method of claim 15, further comprising, after step B and before step A, passing $O_2$ through the reactor bed, the $O_2$ flowing from the second position of the fixed bed reactor to the first position of the fixed bed reactor.

18. A method of claim 1, wherein $0<q<1$.

19. A method of claim 1, wherein the material $M_nX_{p(1-q)}$ is a perovskite.

20. A method of claim 1, wherein the perovskite comprises lanthanum, strontium, iron, oxygen and optionally aluminium.

21. A method of claim 19, wherein the material $M_nX_{p(1-q)}$ is $La_{0.7}Sr_{0.3}FeO_{3-\delta}$ (LSF).

22. A method of claim 10, wherein the reactor is at a temperature of from 500° C. to 1200° C.

* * * * *